United States Patent
Uno et al.

(10) Patent No.: US 9,639,776 B2
(45) Date of Patent: May 2, 2017

(54) IMAGE EVALUATION DEVICE AND IMAGE EVALUATION SYSTEM

(71) Applicant: FUJI XEROX CO., LTD., Tokyo (JP)

(72) Inventors: Miho Uno, Kanagawa (JP); Shinji Sasahara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 54 days.

(21) Appl. No.: 14/719,992

(22) Filed: May 22, 2015

(65) Prior Publication Data

US 2016/0098617 A1 Apr. 7, 2016

(30) Foreign Application Priority Data

Oct. 7, 2014 (JP) .................................. 2014-206533

(51) Int. Cl.
- *G06K 9/00* (2006.01)
- *G06K 9/62* (2006.01)
- *G06T 7/00* (2017.01)

(52) U.S. Cl.
CPC ............ *G06K 9/6202* (2013.01); *G06T 7/001* (2013.01); *G06T 2207/30144* (2013.01); *G06T 2207/30208* (2013.01)

(58) Field of Classification Search
CPC ................. G06K 9/6202; G06T 7/001; G06T 2207/30208; G06T 2207/30144
USPC ........................................................ 382/112
See application file for complete search history.

(56) References Cited

U.S. PATENT DOCUMENTS

| | | | | |
|---|---|---|---|---|
| 5,327,252 A * | 7/1994 | Tsuruoka | ........... | H04N 1/00002 358/406 |
| 5,416,613 A * | 5/1995 | Rolleston | ........... | H04N 1/00002 356/243.5 |
| 5,642,202 A * | 6/1997 | Williams | ............... | H04N 1/047 358/296 |
| 5,712,921 A * | 1/1998 | Zabele | ................ | B41F 33/0036 382/112 |
| 6,081,608 A * | 6/2000 | Fujii | ....................... | B41F 33/00 250/559.05 |
| 6,275,600 B1 * | 8/2001 | Banker | .................. | G06K 15/00 358/406 |
| 2004/0141209 A1 * | 7/2004 | Marumoto | ........... | H04N 1/4078 358/3.26 |

OTHER PUBLICATIONS

Franz Sigg, "Testing for Resolution and Contrast Using the Contrast-Resolution Test Target", pp. 1-5, Nov. 2006, http://cias.rit.edu/~gravure/tt/pdf/pc/TT6_FranzSigg.pdf.

Thomas Liensberger et al., Evaluation of perceptual resolution of printed matter (Fogra L-Score evaluation), Electronic Imaging Symposium, Mar. 19, 2014, 28 pages, http://www.fogra.org/dokumente/upload/evaluation%20of%20perceptual%20resolution%20of%20printed%20matter%20(fogra%20I-score%20evaluation)%202%20-%20thomas%20liensberger,%20andreas%20kraushaar.pdf.

* cited by examiner

*Primary Examiner* — John Strege

(74) *Attorney, Agent, or Firm* — Sughrue Mion, PLLC

(57) ABSTRACT

Provided is an image evaluation device including an acquisition unit that acquires an image including plural patterns having different spatial frequencies and contrasts, and an output unit that compares each of plural patterns included in the image acquired by the acquisition unit with each of plural ideal patterns corresponding to the plural patterns, calculates similarities therebetween, and outputs an evaluation value for evaluating performance regarding a resolution of the image based on a sum of the calculated similarities of the plural patterns.

10 Claims, 28 Drawing Sheets

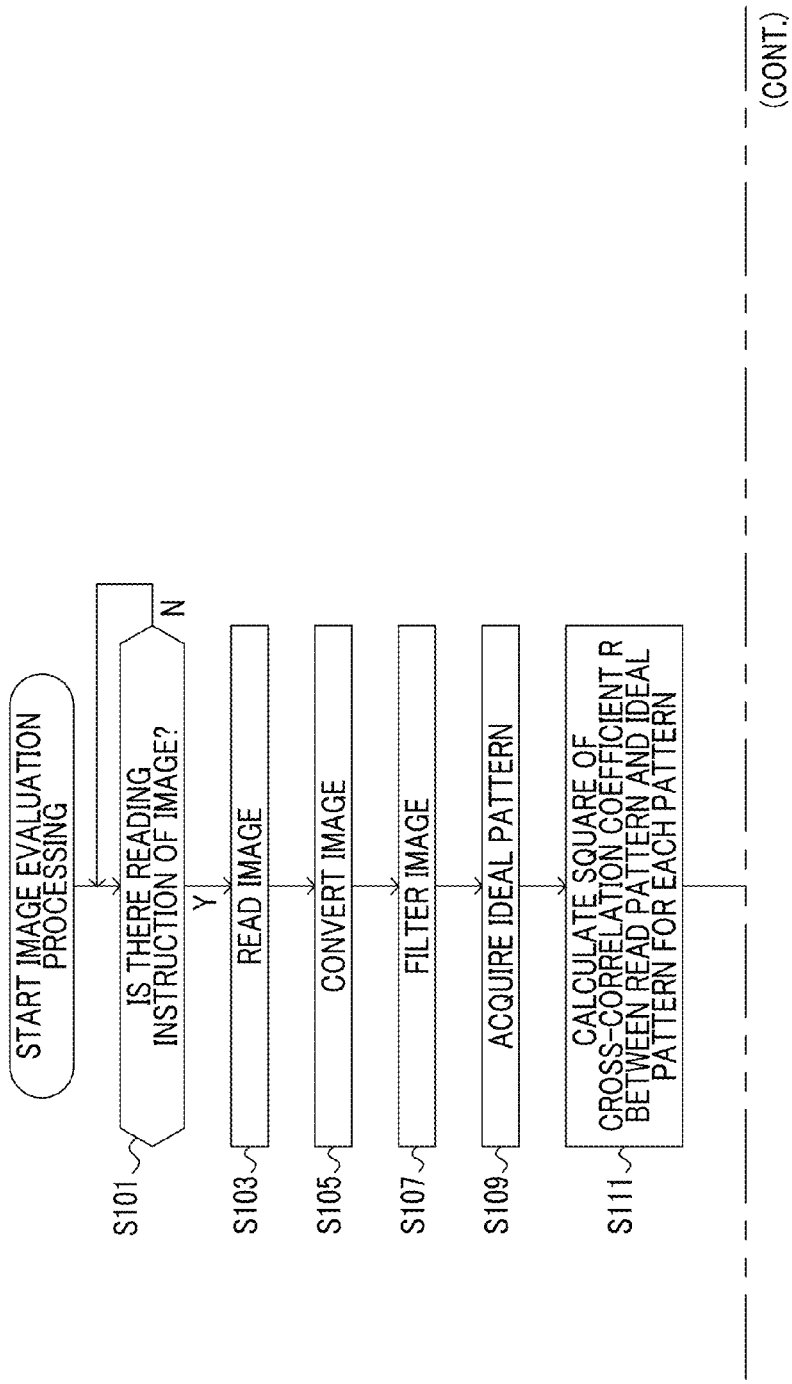

(FIG. 4 Continued)

- S113: EXTRACT PATTERN GROUP EQUAL IN CONTRAST AND SQUARE OF CROSS-CORRELATION COEFFICIENT R OF PATTERN GROUP
- S115: EXTRACT PATTERN HAVING LOWEST SPATIAL FREQUENCY AND SQUARE OF CROSS-CORRELATION COEFFICIENT R1 OF PATTERN
- S117: EXTRACT PATTERN HAVING SECOND HIGHEST SPATIAL FREQUENCY AND SQUARE OF CROSS-CORRELATION COEFFICIENT R2 OF PATTERN
- S119: SQUARE OF R1 > SQUARE OF R2

(CONT.)

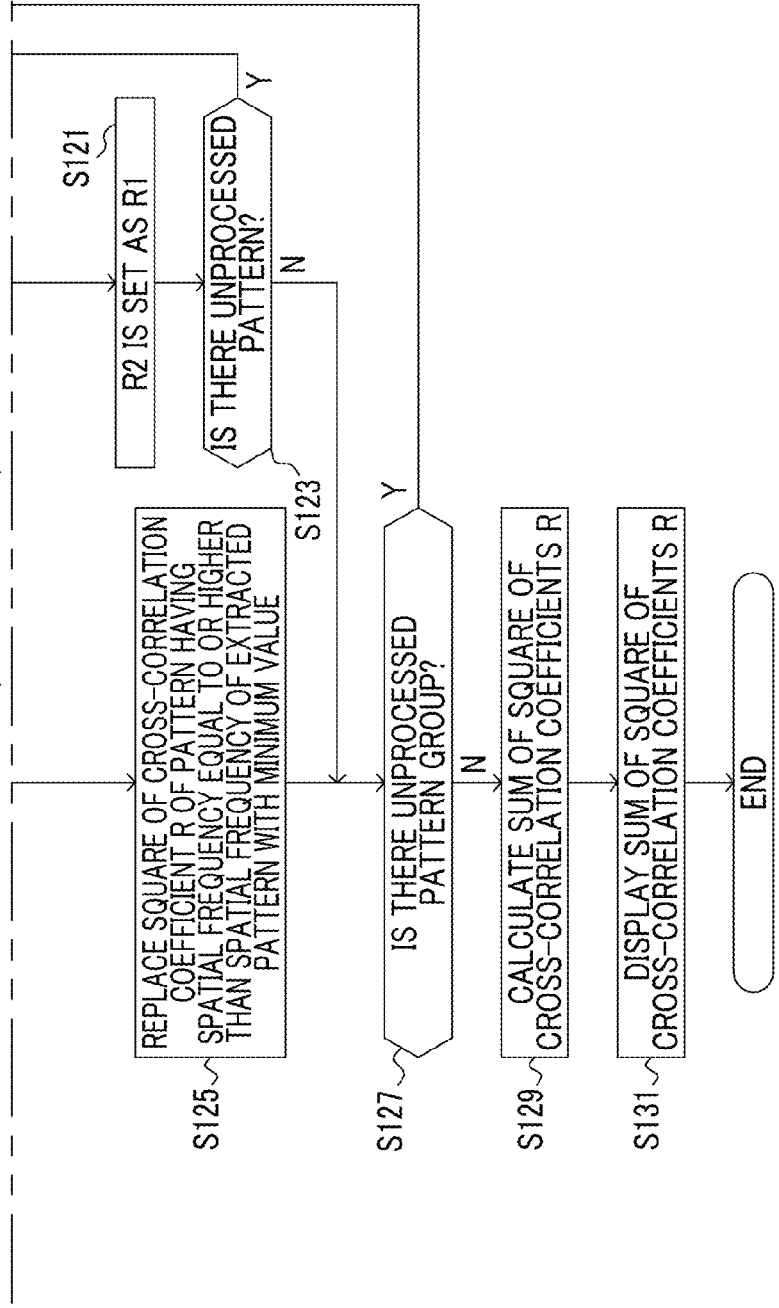

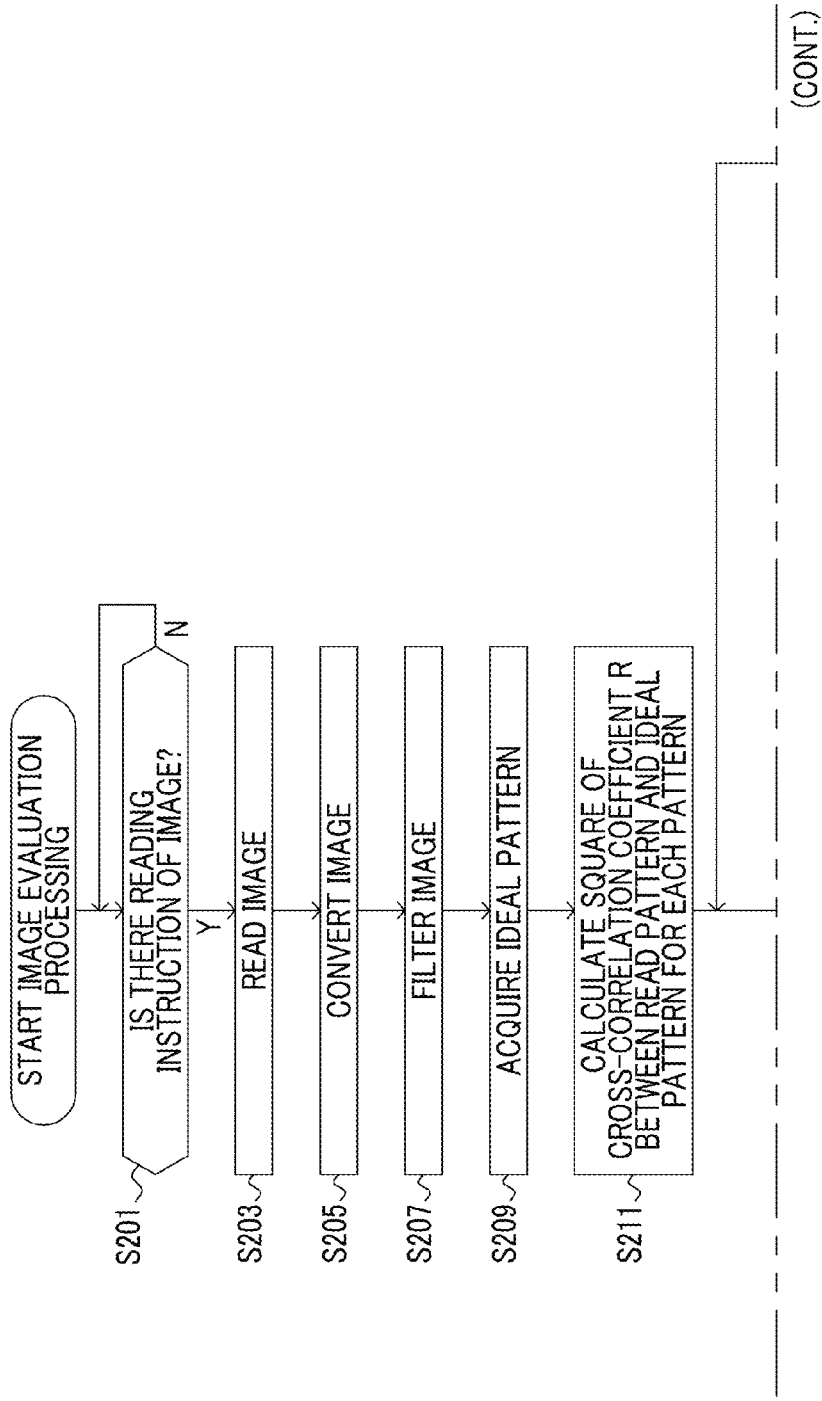

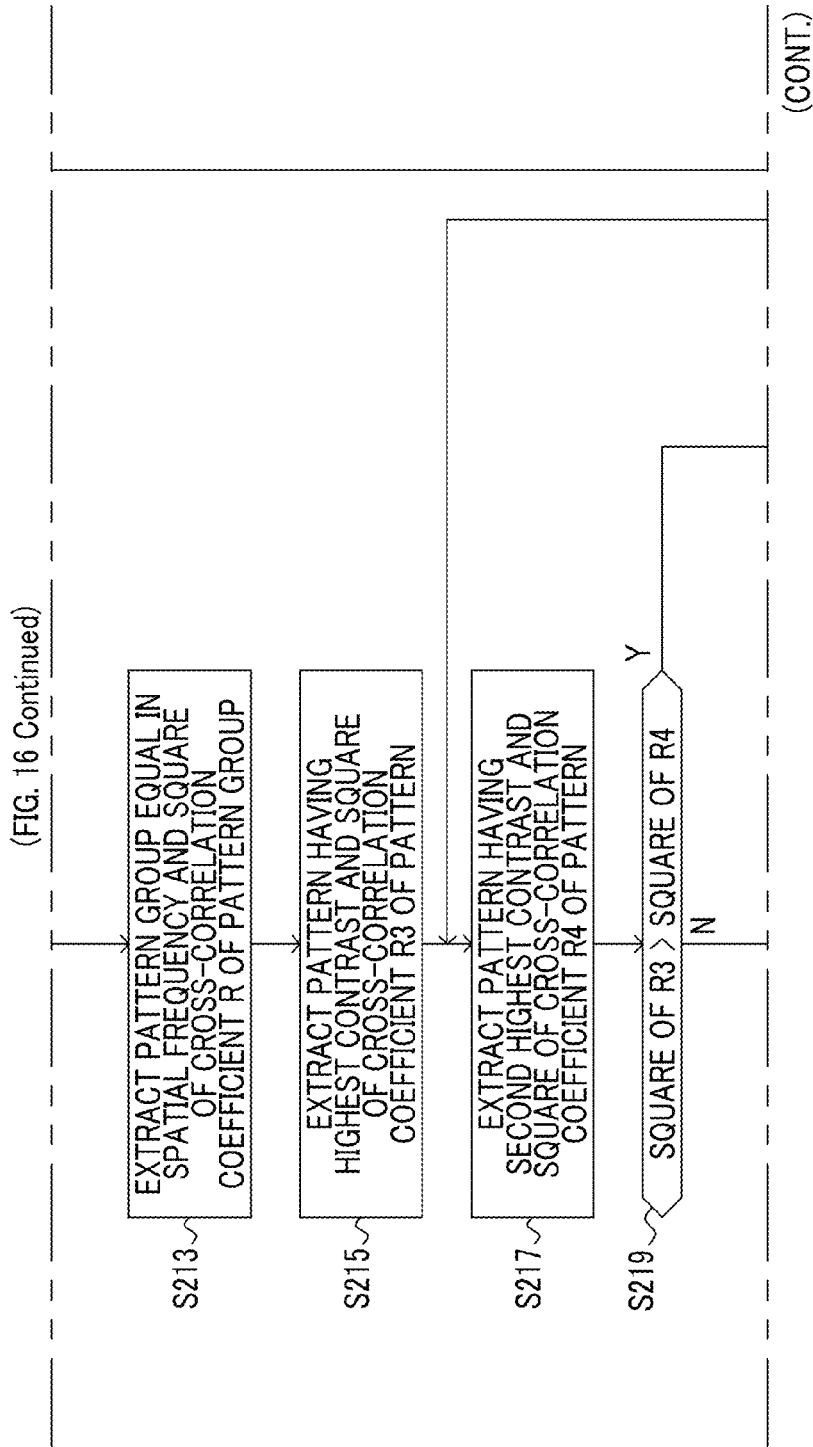

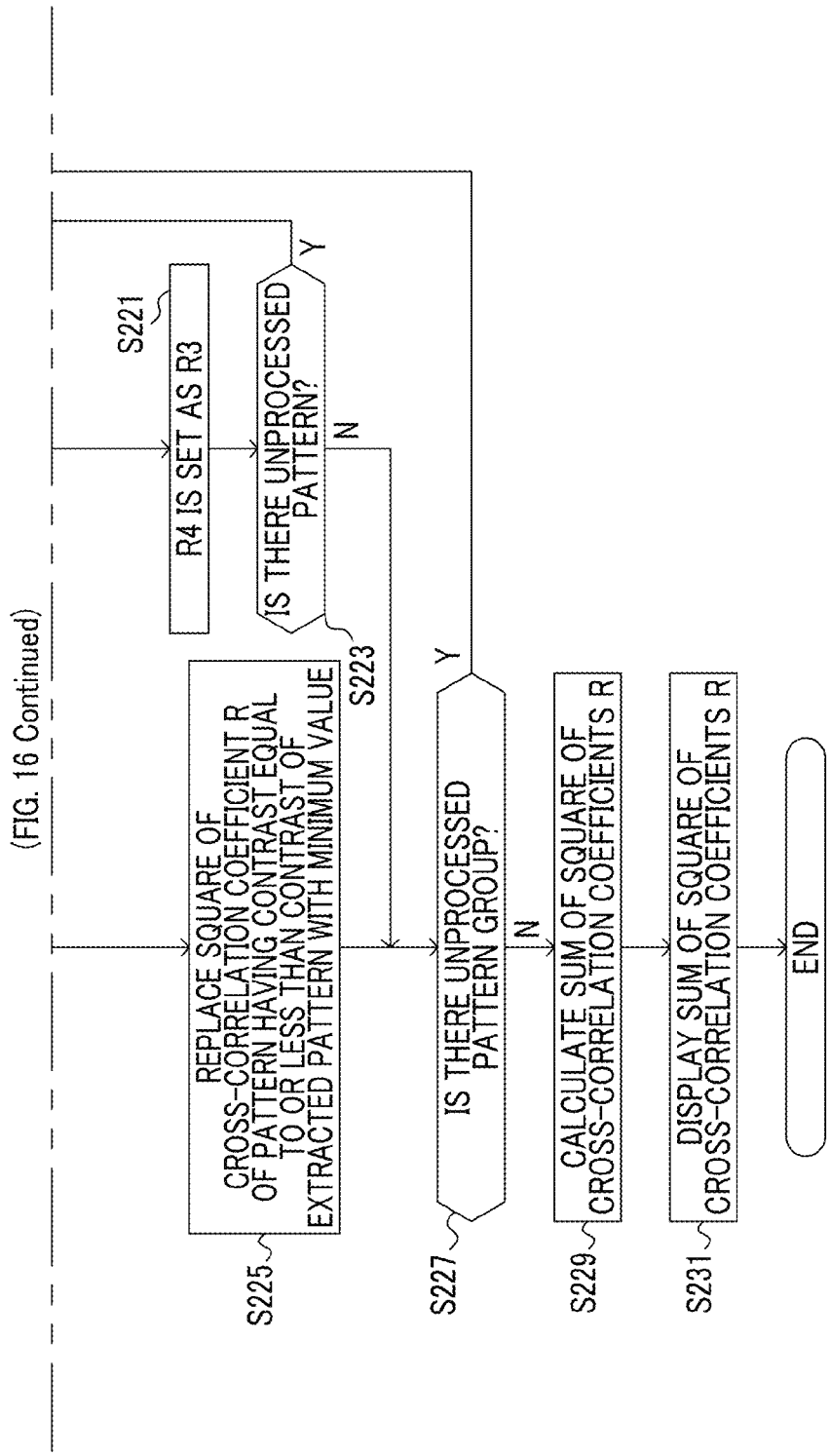

FIG. 17A

| SPATIAL FREQUENCY [1/mm] | CONTRAST[%] | | | | | | | | | |
|---|---|---|---|---|---|---|---|---|---|---|
| | 100 | 59.9 | 35.9 | 21.5 | 12.9 | 7.7 | 4.6 | 2.8 | 1.7 | 1 |
| 0.63 | 0.999 | 0.997 | 0.996 | 0.992 | 0.981 | 0.937 | 0.885 | 0.720 | 0.543 | 0.362 |
| 0.81 | 0.999 | 0.997 | 0.995 | 0.989 | 0.978 | 0.951 | 0.902 | 0.649 | 0.593 | 0.295 |
| 1.04 | 0.996 | 0.996 | 0.992 | 0.985 | 0.966 | 0.908 | 0.782 | 0.699 | 0.521 | 0.174 |
| 1.35 | 0.995 | 0.994 | 0.991 | 0.979 | 0.950 | 0.851 | 0.764 | 0.553 | 0.272 | 0.311 |
| 1.74 | 0.991 | 0.981 | 0.977 | 0.948 | 0.901 | 0.802 | 0.526 | 0.287 | 0.335 | 0.309 |
| 2.24 | 0.982 | 0.953 | 0.925 | 0.862 | 0.740 | 0.588 | 0.299 | 0.124 | 0.106 | 0.227 |
| 2.91 | 0.939 | 0.857 | 0.662 | 0.564 | 0.336 | 0.174 | 0.174 | 0.128 | 0.075 | 0.167 |
| 3.76 | 0.448 | 0.189 | 0.206 | 0.235 | 0.176 | 0.101 | 0.107 | 0.242 | 0.160 | 0.194 |
| 4.85 | 0.184 | 0.106 | 0.114 | 0.020 | 0.124 | 0.171 | 0.159 | 0.142 | 0.336 | 0.261 |
| 6.25 | 0.266 | 0.103 | 0.080 | 0.285 | 0.177 | 0.193 | 0.205 | 0.284 | 0.346 | 0.230 |

FIG. 18A

| SPATIAL FREQUENCY [1/mm] | CONTRAST[%] | | | | | | | | | |
|---|---|---|---|---|---|---|---|---|---|---|
| | 100 | 59.9 | 35.9 | 21.5 | 12.9 | 7.7 | 4.6 | 2.8 | 1.7 | 1 |
| 0.63 | 0.999 | 0.997 | 0.996 | 0.992 | 0.981 | 0.937 | 0.885 | 0.720 | 0.543 | 0.362 |
| 0.81 | 0.999 | 0.997 | 0.995 | 0.989 | 0.978 | 0.951 | 0.902 | 0.649 | 0.593 | 0.295 |
| 1.04 | 0.996 | 0.996 | 0.992 | 0.985 | 0.966 | 0.908 | 0.782 | 0.699 | 0.521 | 0.174 |
| 1.35 | 0.995 | 0.994 | 0.991 | 0.979 | 0.950 | 0.851 | 0.764 | 0.553 | 0.272 | 0.311 |
| 1.74 | 0.991 | 0.981 | 0.977 | 0.948 | 0.901 | 0.802 | 0.526 | 0.287 | 0.335 | 0.309 |
| 2.24 | 0.982 | 0.953 | 0.925 | 0.862 | 0.740 | 0.588 | 0.299 | 0.124 | 0.106 | 0.227 |
| 2.91 | 0.939 | 0.857 | 0.662 | 0.564 | 0.336 | 0.174 | 0.174 | 0.128 | 0.075 | 0.167 |
| 3.76 | 0.448 | 0.189 | 0.206 | 0.235 | 0.176 | 0.101 | 0.107 | 0.242 | 0.160 | 0.194 |
| 4.85 | 0.184 | 0.106 | 0.114 | 0.020 | 0.124 | 0.171 | 0.159 | 0.142 | 0.336 | 0.261 |
| 6.25 | 0.266 | 0.103 | 0.080 | 0.285 | 0.177 | 0.193 | 0.205 | 0.284 | 0.346 | 0.230 |

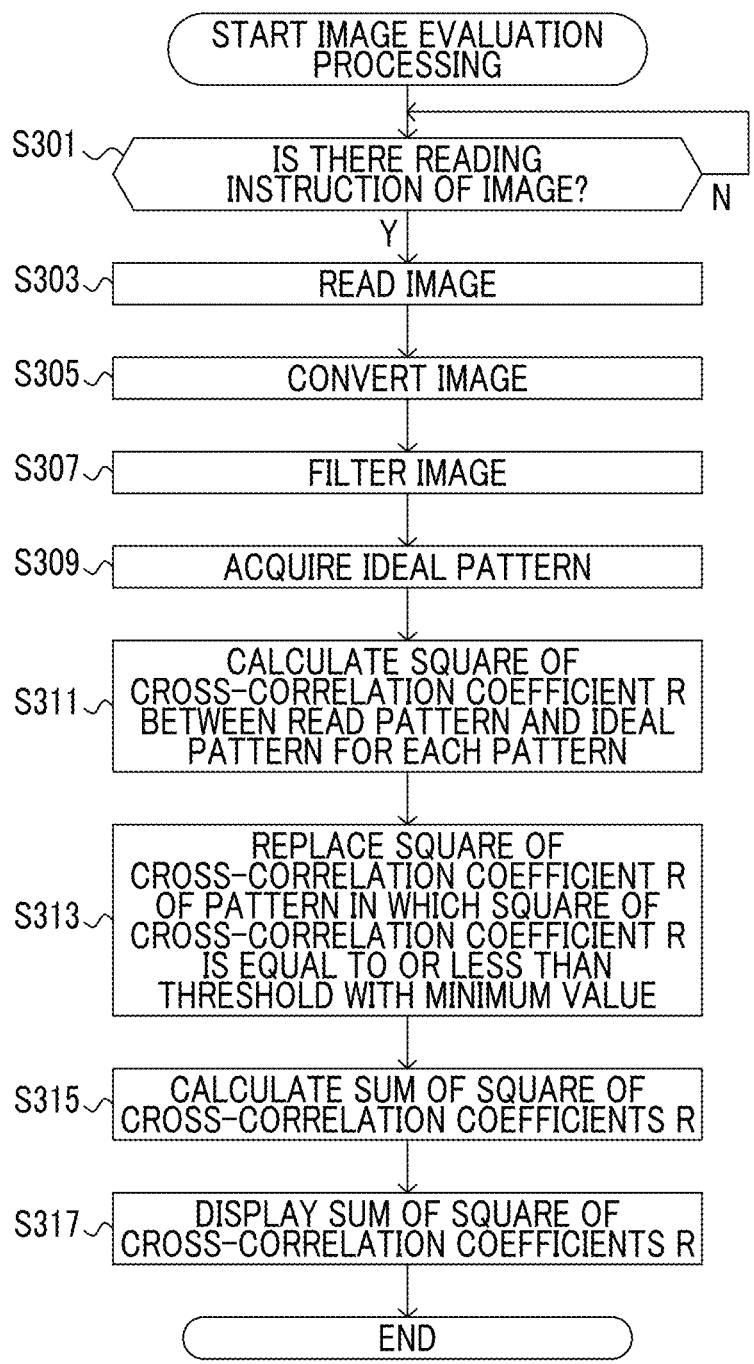

FIG. 20A

| FREQUENCY [1/mm] | CONTRAST[%] | | | | | | | | |
|---|---|---|---|---|---|---|---|---|---|
| | 100 | 59.9 | 35.9 | 21.5 | 12.9 | 7.7 | 4.6 | 2.8 | 1.7 | 1 |
| 0.63 | 0.999 | 0.997 | 0.996 | 0.992 | 0.981 | 0.937 | 0.885 | 0.720 | 0.543 | 0.362 |
| 0.81 | 0.999 | 0.997 | 0.995 | 0.989 | 0.978 | 0.951 | 0.902 | 0.649 | 0.593 | 0.295 |
| 1.04 | 0.996 | 0.996 | 0.992 | 0.985 | 0.966 | 0.908 | 0.782 | 0.699 | 0.521 | 0.174 |
| 1.35 | 0.995 | 0.994 | 0.991 | 0.979 | 0.950 | 0.851 | 0.764 | 0.553 | 0.272 | 0.311 |
| 1.74 | 0.991 | 0.981 | 0.977 | 0.948 | 0.901 | 0.802 | 0.526 | 0.287 | 0.335 | 0.309 |
| 2.24 | 0.982 | 0.953 | 0.925 | 0.862 | 0.740 | 0.588 | 0.299 | 0.124 | 0.106 | 0.227 |
| 2.91 | 0.939 | 0.857 | 0.662 | 0.564 | 0.336 | 0.174 | 0.174 | 0.128 | 0.075 | 0.167 |
| 3.76 | 0.448 | 0.189 | 0.206 | 0.235 | 0.176 | 0.101 | 0.107 | 0.242 | 0.160 | 0.194 |
| 4.85 | 0.184 | 0.106 | 0.114 | 0.020 | 0.124 | 0.171 | 0.159 | 0.142 | 0.336 | 0.261 |
| 6.25 | 0.266 | 0.103 | 0.080 | 0.285 | 0.177 | 0.193 | 0.205 | 0.284 | 0.346 | 0.230 |

FIG. 20B

| FREQUENCY [1/mm] | CONTRAST[%] | | | | | | | | | |
|---|---|---|---|---|---|---|---|---|---|---|
| | 100 | 59.9 | 35.9 | 21.5 | 12.9 | 7.7 | 4.6 | 2.8 | 1.7 | 1 |
| 0.63 | 0.999 | 0.997 | 0.996 | 0.992 | 0.981 | 0.937 | 0.885 | 0.720 | 0.543 | 0 |
| 0.81 | 0.999 | 0.997 | 0.995 | 0.989 | 0.978 | 0.951 | 0.902 | 0.649 | 0.593 | 0 |
| 1.04 | 0.996 | 0.996 | 0.992 | 0.985 | 0.966 | 0.908 | 0.782 | 0.699 | 0.521 | 0 |
| 1.35 | 0.995 | 0.994 | 0.991 | 0.979 | 0.950 | 0.851 | 0.764 | 0.553 | 0 | 0 |
| 1.74 | 0.991 | 0.981 | 0.977 | 0.948 | 0.901 | 0.802 | 0.526 | 0 | 0 | 0 |
| 2.24 | 0.982 | 0.953 | 0.925 | 0.862 | 0.740 | 0.588 | 0 | 0 | 0 | 0 |
| 2.91 | 0.939 | 0.857 | 0.662 | 0.564 | 0 | 0 | 0 | 0 | 0 | 0 |
| 3.76 | 0 | 0 | 0 | 0 | 0 | 0 | 0 | 0 | 0 | 0 |
| 4.85 | 0 | 0 | 0 | 0 | 0 | 0 | 0 | 0 | 0 | 0 |
| 6.25 | 0 | 0 | 0 | 0 | 0 | 0 | 0 | 0 | 0 | 0 |

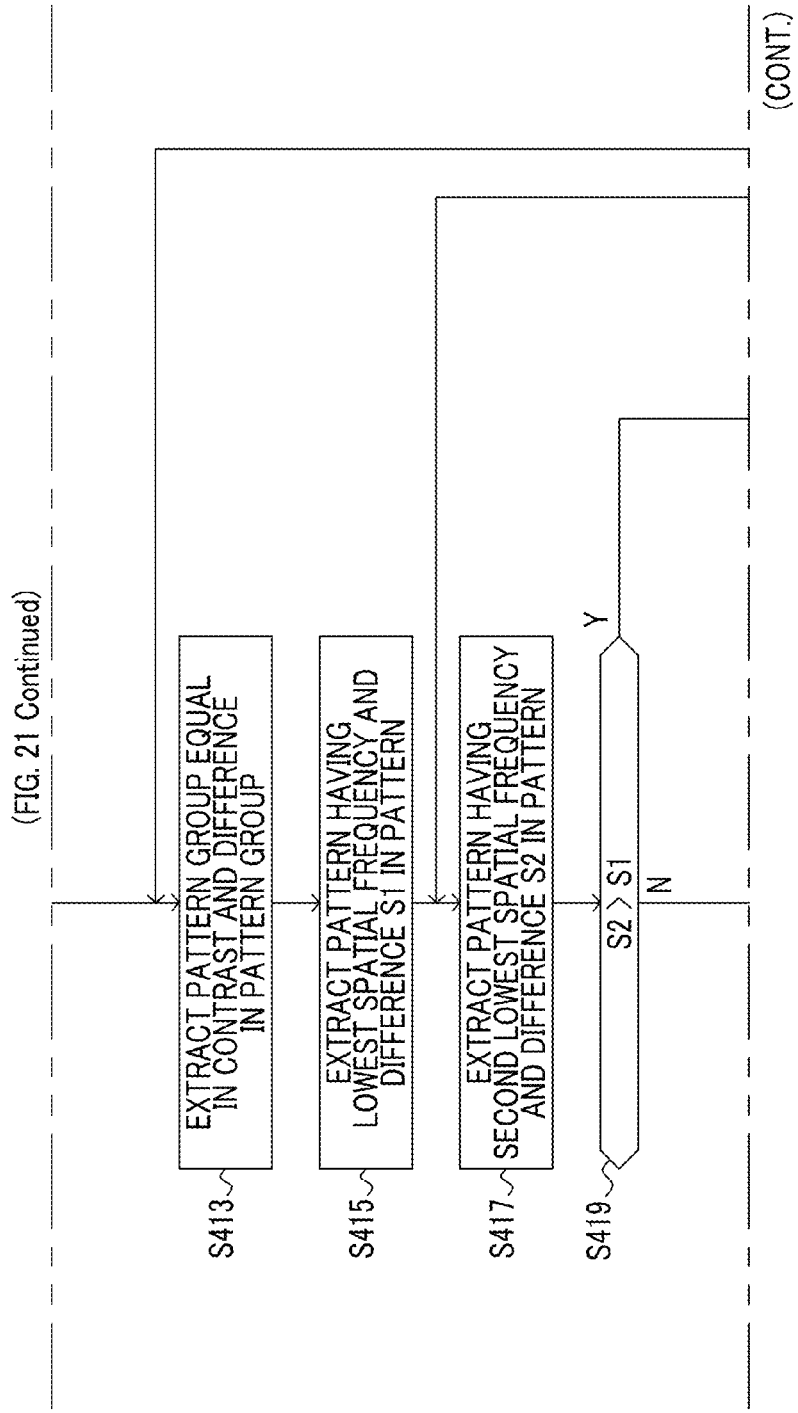

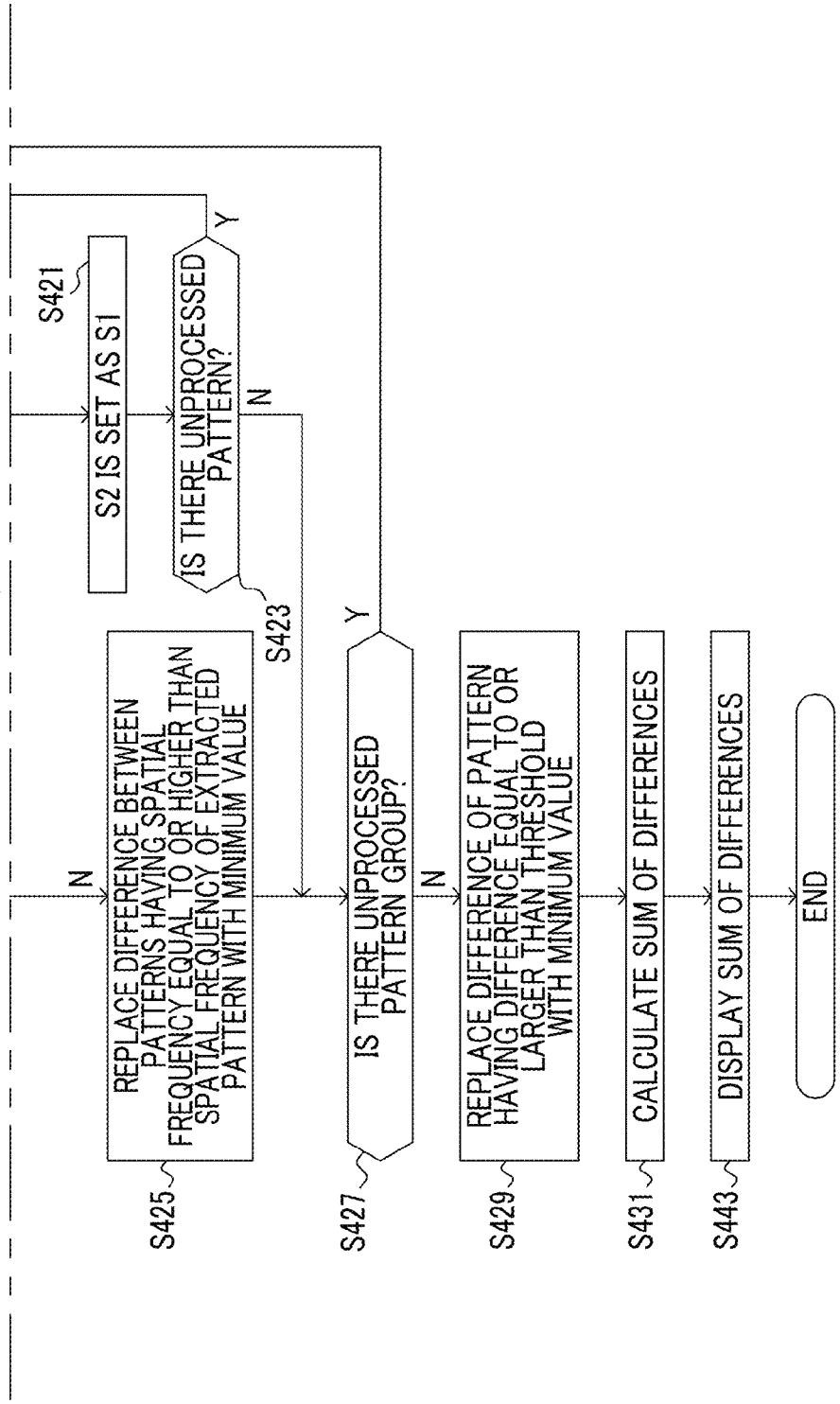

IMAGE EVALUATION DEVICE AND IMAGE EVALUATION SYSTEM

CROSS-REFERENCE TO RELATED APPLICATIONS

This application is based on and claims priority under 35 USC 119 from Japanese Patent Application No. 2014-206533 filed Oct. 7, 2014.

BACKGROUND

Technical Field

The present invention relates to an image evaluation device and an image evaluation system.

SUMMARY

According to an aspect of the invention, there is provided an image evaluation device including:

an acquisition unit that acquires an image including plural patterns having different spatial frequencies and contrasts; and an output unit that compares each of plural patterns included in the image acquired by the acquisition unit with each of plural ideal patterns corresponding to the plural patterns, calculates similarities therebetween, and outputs an evaluation value for evaluating performance regarding a resolution of the image based on a sum of the calculated similarities of the plural patterns.

BRIEF DESCRIPTION OF THE DRAWINGS

Exemplary embodiments of the present invention will be described in detail based on the following figures, wherein:

FIG. 4 is a flow diagram illustrating a flow of processes of a program of evaluation value calculation processing according to a first exemplary embodiment;

FIG. 16 is a flow diagram illustrating a flow of processes of a program of image evaluation processing according to a second exemplary embodiment;

FIG. 17A is a table illustrating calculation results of a similarity based on an image evaluation device according to the second exemplary embodiment;

FIG. 18A is a table illustrating the calculation results of the similarity based on the image evaluation device according to the second exemplary embodiment;

FIG. 19 is a flow diagram illustrating a flow of processes of a program of image evaluation processing according to a third exemplary embodiment;

FIG. 20A is a table illustrating calculation results of a similarity based on an image evaluation device according to the third exemplary embodiment;

FIG. 20B is a table illustrating an example of a state in which a similarity of a read pattern which is expected to have a spurious resolution generated therein is replaced with a predetermined value, in the table illustrating the calculation results of the similarity based on the image evaluation device according to the third exemplary embodiment.

DETAILED DESCRIPTION

Hereinafter, an exemplary embodiment of the present invention will be described in detail with reference to the accompanying drawings.

[First Exemplary Embodiment]

First, an image evaluation device according to the present exemplary embodiment will be described.

Figure 1:
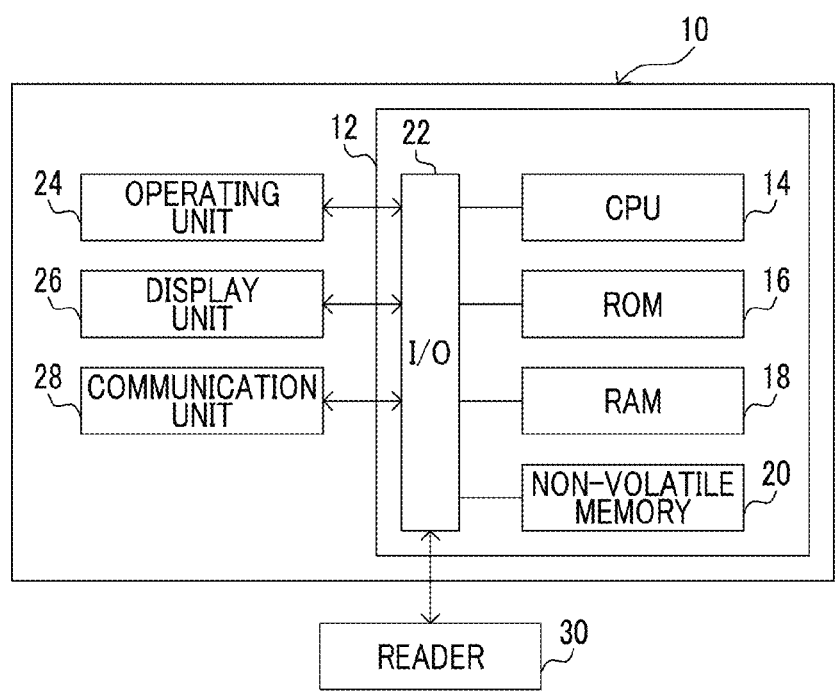
FIG. 1 is a block diagram illustrating an electrical configuration of an image evaluation device according to an exemplary embodiment.

As shown in FIG. 1, an image evaluation device 10 according to the present exemplary embodiment includes a controller 12 that controls the entire device. In addition, the controller 12 includes a CPU (Central Processing Unit) 14 that executes various processes including image evaluation processing described later, and a ROM (Read Only Memory) 16 that stores a program used in the process of the CPU 14 and various information. In addition, the controller 12 includes a RAM (Random Access Memory) 18 that temporarily stores various data as a work area of the CPU 14, and a non-volatile memory 20 that stores various information used in the process of the CPU 14. Further, the controller 12 includes an I/O interface 22 that inputs and outputs data with respect to an external device which is connected to the image evaluation device 10. An operating unit 24 operated by a user, a display unit 26 that displays various information, a communication unit 28 that performs communication with an external device, and a reader that reads an image printed on a printing medium are connected to the I/O interface 22. The reader 30 is configured to include a color scanner as an example in the present exemplary embodiment, reads a reading object disposed at a predetermined reading position, generates image information represented by RGB based on the read image, and outputs the generated image information.

Figure 2:
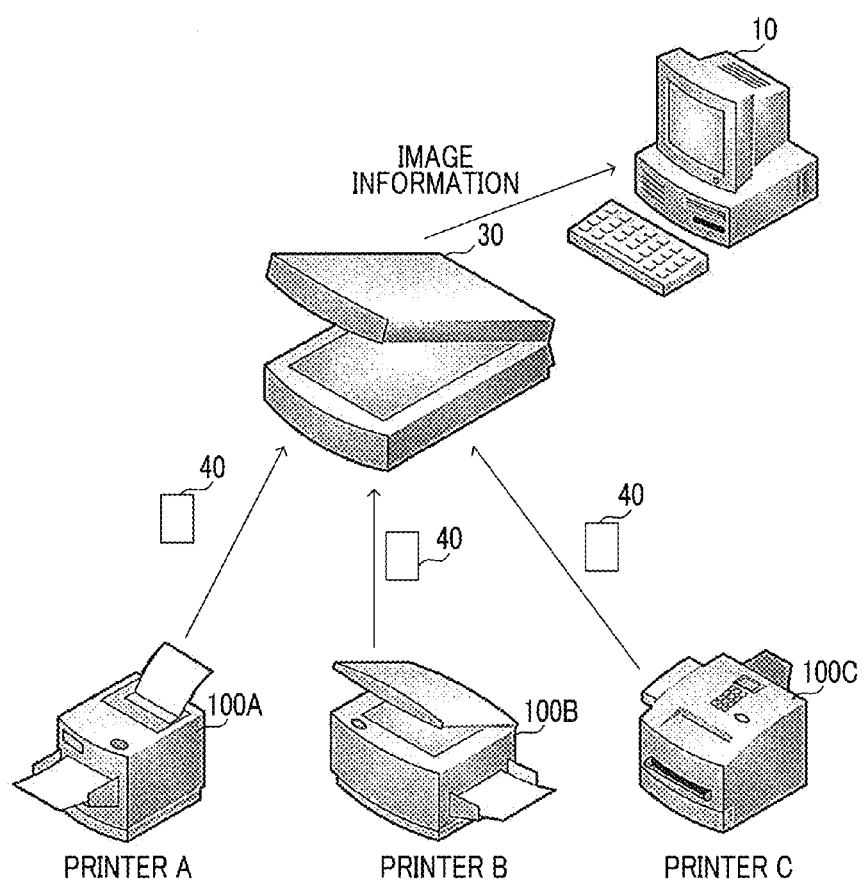
FIG. 2 is a conceptual diagram required for describing image evaluation processing performed by the image evaluation device according to the exemplary embodiment.

Here, the image evaluation device 10 according to the present exemplary embodiment performs image evaluation processing of calculating an evaluation value for evaluating performance regarding the resolution of a printer. In this case, as shown in FIG. 2, the image evaluation device 10 acquires a read image obtained by a pattern image printed on a printing medium 40 by a printer which is an evaluation object being read by the reader 30, and calculates the above evaluation value using this read image. Meanwhile, in FIG. 2, printers A to C are set as printers which are evaluation objects.

The above pattern image is a pattern image including plural patterns having different spatial frequencies and contrasts. Meanwhile, the above plural patterns are patterns in which plural circle of a first color having different radii and plural circles of a second color having different radii are alternately drawn as concentric circles. In the present exemplary embodiment, the first color is set as black, and the second color is set as white. In addition, the term "spatial frequency" used herein refers to the number of sets of the circle of the first color and the circle of the second color, adjacent to each other, which are drawn within a width of 1 mm in a concentric radial direction. Further, the term "contrast" used herein refers to a light and darkness ratio between the circle of the first color and the circle of the second color.

Figure 3:
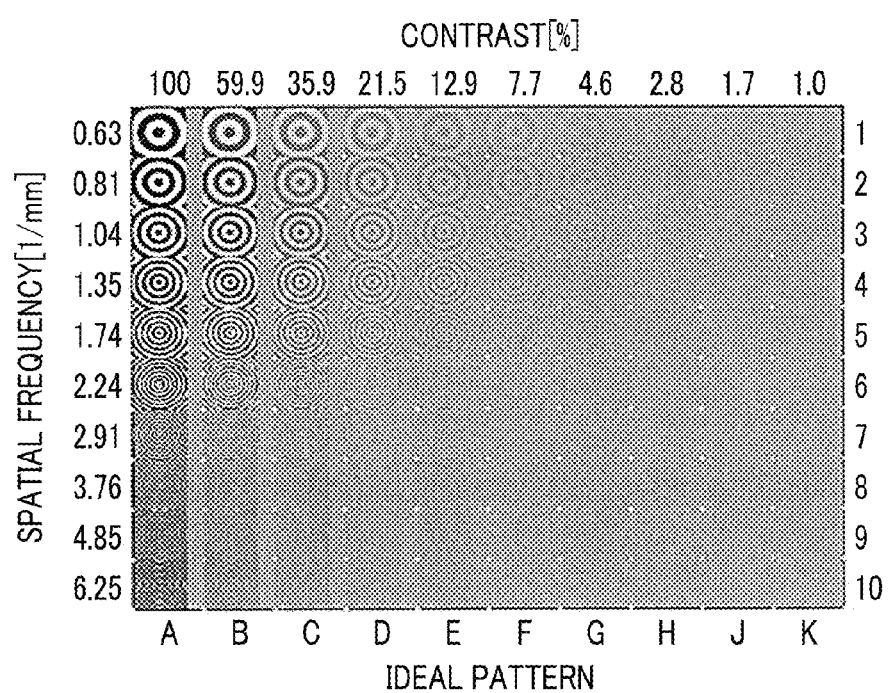
FIG. 3 is a front view illustrating an example of an ideal pattern according to the exemplary embodiment.

As shown in FIG. 3, plural patterns are arrayed in a grid shape in the above pattern image so that the spatial frequency gradually increases in a first predetermined direction (vertical axis direction of FIG. 3) and the contrast gradually lowers in a second direction (horizontal axis direction of FIG. 3) intersecting the first predetermined direction. In addition, in the above pattern image, pattern groups equal in contrast are arrayed in the vertical axis direction, and pattern groups equal in spatial frequency are arrayed in the horizontal axis direction.

On the other hand, the image evaluation device 10 stores image information, in the non-volatile memory 20, which indicates an ideal pattern corresponding to each of the plural patterns included in the pattern image which is used as a comparison object when the read image is evaluated. In the present exemplary embodiment, original data of the pattern image used in printing performed by the printer is used as the image information indicating the ideal pattern.

Next, a flow of processes when the CPU 14 of the image evaluation device 10 according to the present exemplary embodiment performs the image evaluation processing will be described with reference to a flow diagram shown in FIG. 4. Meanwhile, in the present exemplary embodiment, a program of the image evaluation processing is stored in the non-volatile memory 20 in advance, but there is no limitation thereto. For example, the program of the image evaluation processing may be received from an external device through the communication unit 28 and be stored in the non-volatile memory 20. In addition, the program of the image evaluation processing which is recorded on a recording medium such as a CD-ROM is read through the I/O interface 22 by a CD-ROM drive or the like, and thus the image evaluation processing may be executed.

In order to cause the reader 30 to read the printing medium 40 on which the pattern image is printed by any of the printers A to C, a user disposes the printing medium 40 at the reading position of the reader 30, operates the operating unit 24, and inputs an image reading instruction.

Consequently, in step S101, it is determined whether the reading instruction of image is input. When the reading instruction is not input (S101, N), the process stands by as it is. When the reading instruction is input (S101, Y), the flow transitions to step S103.

In step S103, the reader 30 is caused to read the pattern image from the disposed printing medium 40, and image information indicating the read image is acquired from the reader 30.

In the next step S105, a process of converting the read image is performed. In the present exemplary embodiment, since each pixel value of the read image is represented by RGB, image information indicating the read image is converted from RGB into CIELAB. Meanwhile, in this case, the value of luminosity L* is used in the calculation of a similarity (value indicating the degree of similarity of read patterns which are plural patterns included in the read image with respect to the ideal pattern) described later.

In the next step S107, a filtering process using a smoothing filter is performed on the read image. This smoothing filter is, for example, a Gaussian filter corresponding to a visual distance of 40 cm. Using this filtering process, image processing is performed on the read image so as to come close to an image which is confirmed by a human being through the psychological scaling (sensory evaluation) of a visual sense or the like.

In the next step S109, image information indicating the ideal pattern is acquired. In the present exemplary embodiment, the CPU 14 acquires image information which is stored in the non-volatile memory 20 in advance, but may receive image information from an external device through the communication unit 28 without being limited thereto, to thereby acquire the image information. In addition, image information recorded on a recording medium such as a CD-ROM may be read through the I/O interface 22 by a CD-ROM drive or the like, to thereby acquire the image information.

In the next step S111, the square of a cross-correlation coefficient R between the read pattern included in the read image on which the filtering process is performed in step S107 and the ideal pattern acquired in step S109 is calculate as the similarity for each read pattern.

Meanwhile, the cross-correlation coefficient R is obtained by the following Formula (1) when the pixel value of the read pattern is set as xi, the pixel value of the ideal pattern is set as yi (i is a suffix indicating the position of a pixel), and the number of pixels of the read pattern is set as n. In the present exemplary embodiment, the similarity is calculated by squaring the obtained cross-correlation coefficient R. When the square of the cross-correlation coefficient R is set as the similarity, the read pattern shows a deterioration from the ideal pattern with a decrease in the square of the cross-correlation coefficient R. In addition, in the read pattern, the degree indicating that the reproduction of the ideal pattern is satisfactory (similar) becomes larger with an increase in the square of the cross-correlation coefficient R.

$$R = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

Here, it can be understood that there is the possibility of a spurious resolution, for which a fine portion which is not originally resolved seems to be resolved, being generated in a frequency domain higher than that of a cutoff frequency in which an OTF (Optical Transfer Function) is set as 0. For this reason, a read pattern in which a spurious resolution is expected to be generated is excluded from the evaluation object by performing processes of steps S113 to S127 described later.

In step S113, a pattern group equal in contrast and the square of the cross-correlation coefficient R of read patterns included in the pattern group are extracted from the square of the cross-correlation coefficient R calculated in step S111. For example, as in a pattern group 50 of FIG. 5A, the square of the cross-correlation coefficient R of pattern groups having a contrast of 100[%] and different spatial frequencies is extracted.

In the next step S115, a read pattern having a lowest spatial frequency and the square of a cross-correlation coefficient R1 of the read pattern are extracted from the read patterns included in the pattern group extracted in step S113. For example, the square of the cross-correlation coefficient R1 of a read pattern having a lowest spatial frequency of 0.63 [1/mm] is extracted from the pattern group 50 of FIG. 5A.

In the next step S117, a read pattern having the second highest spatial frequency next to the read pattern extracted in step S115 and the square of a cross-correlation coefficient R2 of the read pattern are extracted from the read patterns included in the pattern group extracted in step S113. For example, the square of the cross-correlation coefficient R2 of a read pattern having a spatial frequency of 0.81 [1/mm] right above 0.63 [1/mm] is extracted from the pattern group 50 of FIG. 5A.

In the next step S119, it is determined whether the square of the cross-correlation coefficient R1 extracted in step S115 is larger than the square of the cross-correlation coefficient R2 extracted in step S117. When the square of the cross-correlation coefficient R1 is not larger than the square of the cross-correlation coefficient R2 (S119, N), a spurious resolution is predicted to be generated, and thus the flow transitions to step S125. On the other hand, when the square of the cross-correlation coefficient R2 is larger than the square of the cross-correlation coefficient R1 (S119, Y), a spurious resolution is predicted not to be generated, and the flow transitions to step S121.

In step S121, the cross-correlation coefficient R2 of the read pattern extracted in step S117 is set as the cross-correlation coefficient R1. In the next step S123, it is determined whether unprocessed read patterns, that is, read patterns which are not extracted in any of steps S115 and S117 among the read patterns extracted in step S113 are present. When the unprocessed read patterns are present (S123, Y), the flow transitions to step S117. On the other hand, when the unprocessed read patterns are not present (S123, N), the flow transitions to step S127 described later.

Figure 5A:
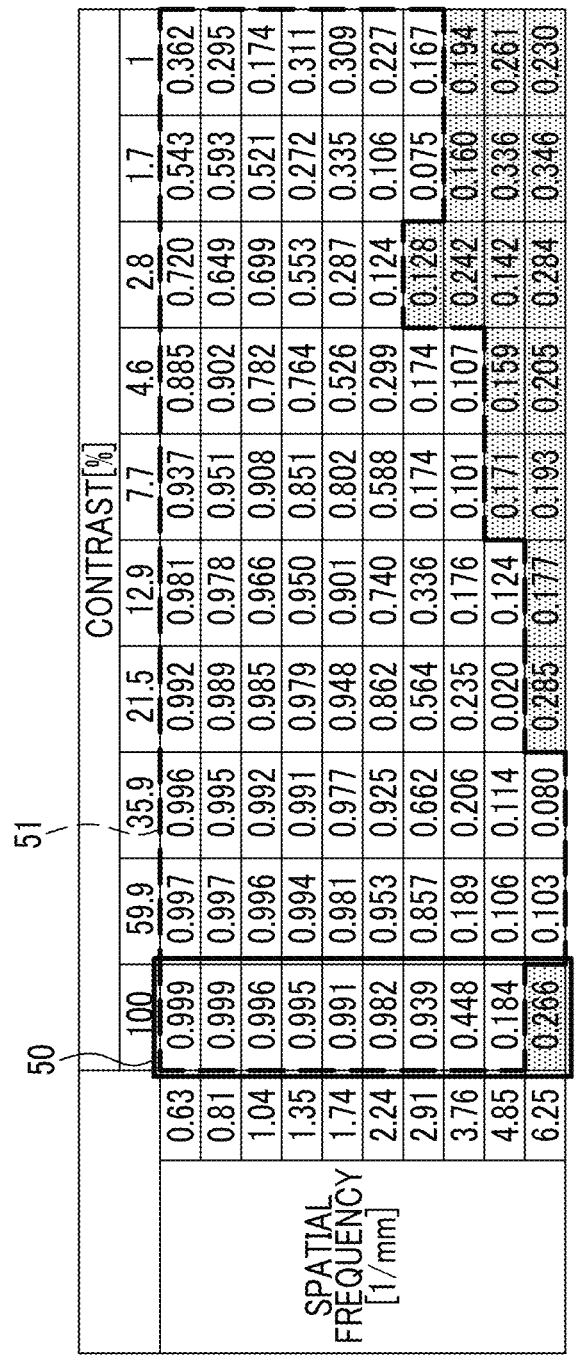
FIG. 5A is a table illustrating an example of calculation results of a similarity based on an image evaluation device according to the first exemplary embodiment.
Figure 5B:
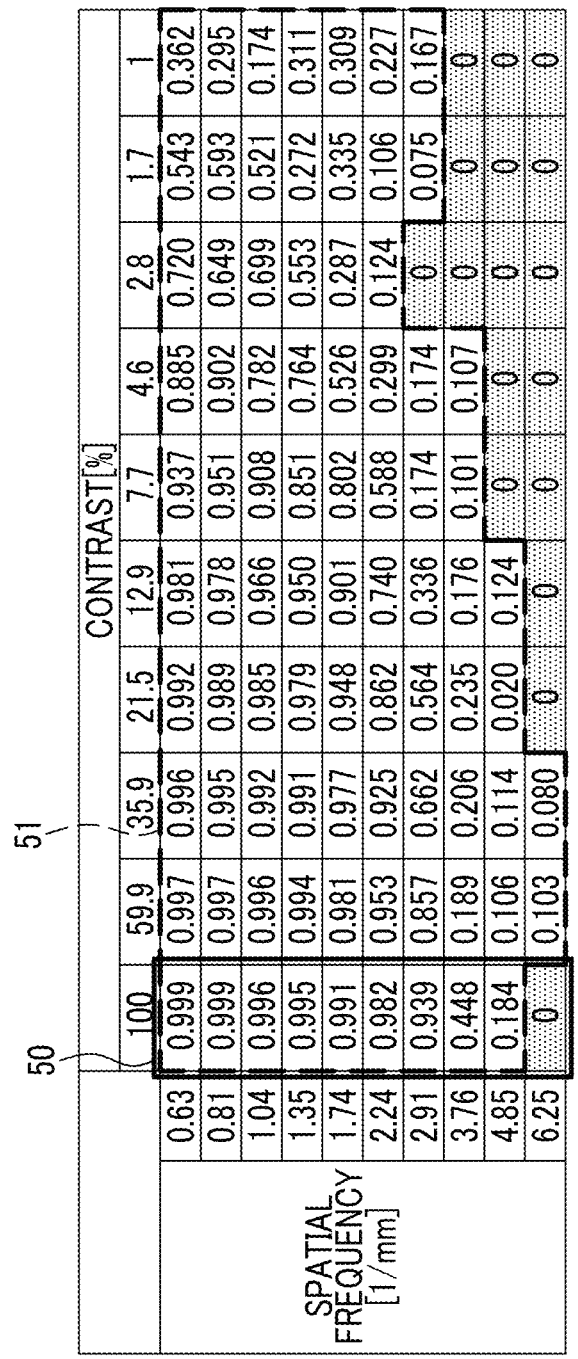
FIG. 5B is a table illustrating an example of a state in which a similarity of a read pattern which is expected to have a spurious resolution generated therein is replaced with a predetermined value, in the calculation results of the similarity based on the image evaluation device according to the first exemplary embodiment.

On the other hand, in step S125, the square of the cross-correlation coefficient R of a read pattern having a spatial frequency equal to or higher than the spatial frequency of the read pattern extracted in step S117 is replaced with a predetermined value. In the present exemplary embodiment, the above predetermined value is set as zero (0) which is a minimum value in a range in which the square of the cross-correlation coefficient R is acquired. That is, as shown in FIGS. 5A and 5B, among similarities of each of the plural read patterns, similarities in a range other than a range 51 in which the similarity gradually becomes smaller as the spatial frequency increases are replaced with zero (0). This replacement leads to the similarity incorrectly calculated by the spurious resolution being added to the evaluation object, and thus the evaluation results are avoided from deviating from an evaluation based on a psychological scaling of a human visual sense or the like.

In step S127, it is determined whether unprocessed pattern groups, that is, pattern groups on which the processes of steps S113 to S125 are not performed are present. When the unprocessed pattern groups are present (S127, Y), the flow transitions to step S113. On the other hand, when the unprocessed pattern groups are not present (S127, N), the flow transitions to step S129 described later. For example, pattern groups are extracted in descending order of contrast from plural pattern groups included in the pattern image in step S113, the processes of steps S115 to S125 are performed on all the pattern groups, and then the flow transitions to step S129.

In step S129, the sum of the square of the cross-correlation coefficients R of the read patterns included in the read image is calculated as an evaluation value. In the next step S131, the display unit 26 is controlled so that the calculated evaluation value is displayed on the display unit 26, and the execution of the program is terminated.

Meanwhile, in the present exemplary embodiment, the evaluation value is calculated using the square of the cross-correlation coefficient R between the read pattern and the ideal pattern, but the evaluation value may be calculated using the cross-correlation coefficient R or the cube of the cross-correlation coefficient R without being limited thereto. When the cross-correlation coefficient R is used as it is, and when the cube of the cross-correlation coefficient R is used, it is preferable to use the absolute value of the cross-correlation coefficient R and the cube of the absolute value of the cross-correlation coefficient R, respectively, at the time of calculating the similarity and the evaluation value.

Figure 6:
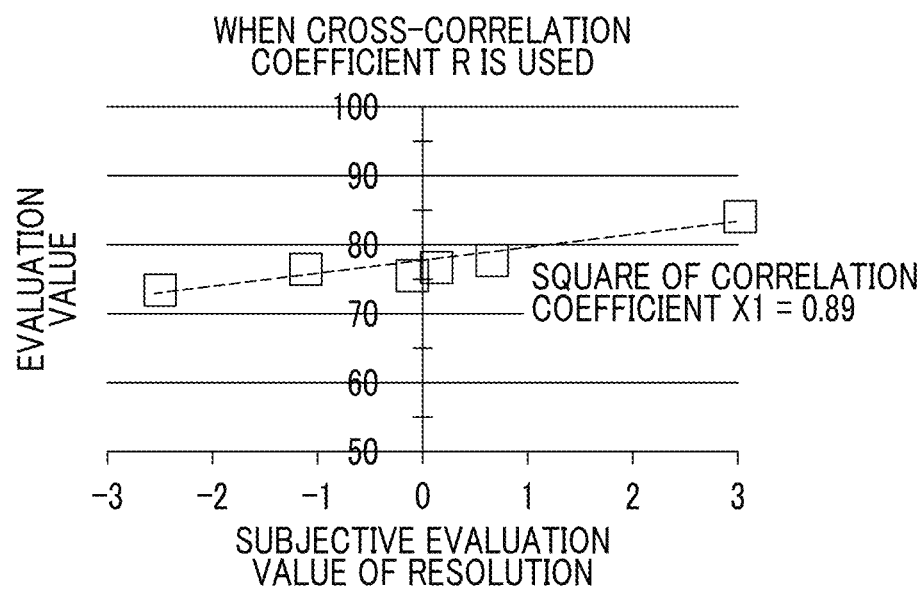
FIG. 6 is a graph illustrating an example of a relationship between calculation results of an evaluation value and a subjective evaluation value of a resolution when a cross-correlation coefficient R based on the image evaluation device according to the first exemplary embodiment is used.

FIG. 6 shows a graph indicating results in which a relationship between the subjective evaluation value of the resolution as performance regarding the resolution and the evaluation value calculated using the cross-correlation coefficient R is obtained. As shown in FIG. 6, the square of a correlation coefficient X1 between the subjective evaluation value of the resolution and the evaluation value calculated using the cross-correlation coefficient R is 0.89. Meanwhile, the subjective evaluation value of the resolution is a value obtained by evaluating and digitizing a resolution based on plural human visual senses, and means that the resolution increases with an increase in a positive direction.

Here, the subjective evaluation of the resolution is performed by the following method. First, under a fluorescent light of a D50 standard light source, in a state where a panel and an object to be evaluated are separated 50 cm apart from each other, the lineup of plural objects to be evaluated in order of being considered to have high resolution is performed on the seven panels. The average value of the orders is calculated for each object to be evaluated, and the subjective evaluation value of the resolution is obtained by converting the calculated average value into a distance scale.

Figure 7:
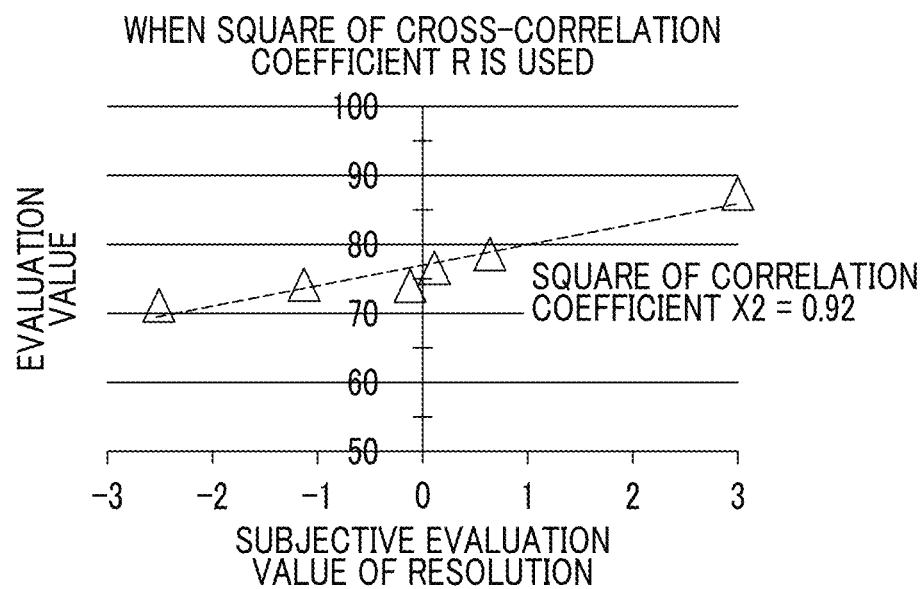
FIG. 7 is a graph illustrating an example of a relationship between the calculation results of the evaluation value and the subjective evaluation value of the resolution when the square of the cross-correlation coefficient R based on the image evaluation device according to the first exemplary embodiment is used.

In addition, FIG. 7 shows a graph indicating results in which a relationship between the subjective evaluation value of the resolution and the evaluation value calculated using the square of the cross-correlation coefficient R is obtained. As shown in FIG. 7, the square of a correlation coefficient X2 between the subjective evaluation value of the resolution and the evaluation value calculated using the square of the cross-correlation coefficient R is 0.92.

Figure 8:
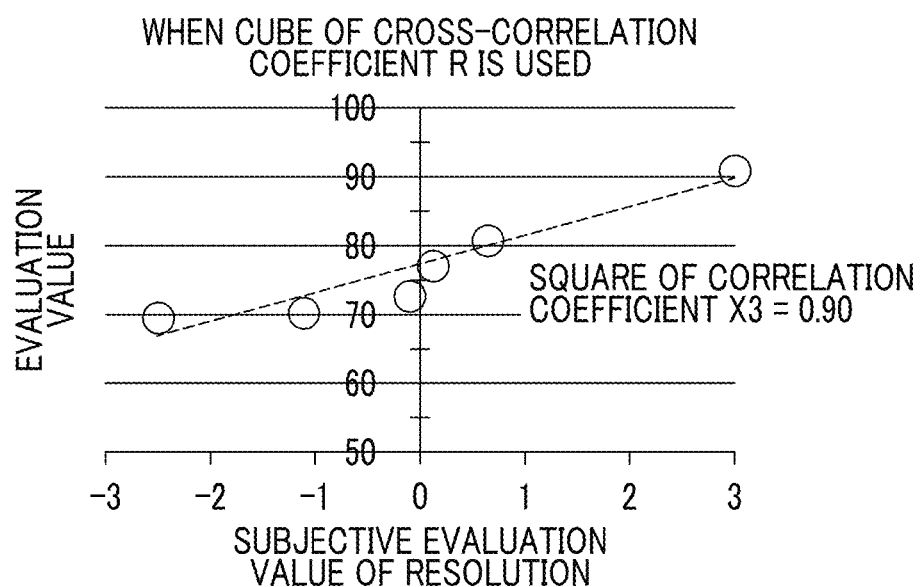
FIG. 8 is a graph illustrating an example of a relationship between the calculation results of the evaluation value and the subjective evaluation value of the resolution when the cube of the cross-correlation coefficient R based on the image evaluation device according to the first exemplary embodiment is used.

In addition FIG. 8 shows a graph indicating results in which a relationship between the subjective evaluation value of the resolution and the evaluation value calculated using the cube of the cross-correlation coefficient R is obtained. As shown in FIG. 8, the square of a correlation coefficient X3 between the subjective evaluation value of the resolution and the evaluation value calculated using the square of the cross-correlation coefficient R is 0.90.

Figure 9:
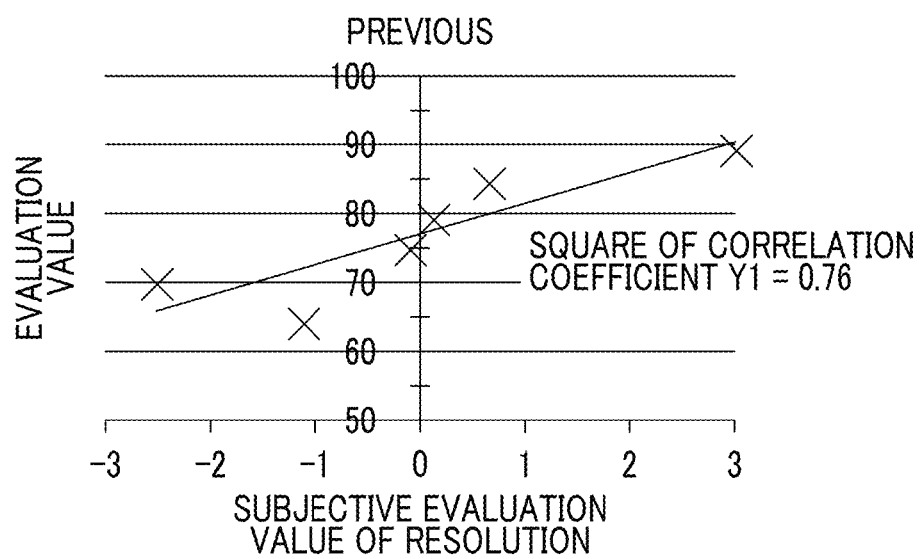
FIG. 9 is a graph illustrating an example of a relationship between the calculation results of the evaluation value and the subjective evaluation value of the resolution when a previous method based on the image evaluation device according to the first exemplary embodiment is used.

On the other hand, FIG. 9 shows a graph indicating results in which a relationship between the subjective evaluation value of the resolution and an evaluation value calculated using a previous evaluation method is obtained. As shown in FIG. 9, the square of a correlation coefficient Y1 between the subjective evaluation value of the resolution and the evaluation value calculated using the previous evaluation method is 0.76. Meanwhile, in the previous evaluation method using this graph, L-Score mentioned above is used as the evaluation value.

From FIGS. 6 to 9, it can be understood that the evaluation value calculated using the square of the cross-correlation coefficient R shows a highest correlation with respect to the subjective evaluation value of the resolution. In addition, it can be understood that the evaluation value calculated using the cross-correlation coefficient R itself and the evaluation value calculated using the cube of the cross-correlation coefficient R also show a higher correlation with respect to the subjective evaluation value of the resolution than the evaluation value calculated using the previous evaluation method.

Figure 10:
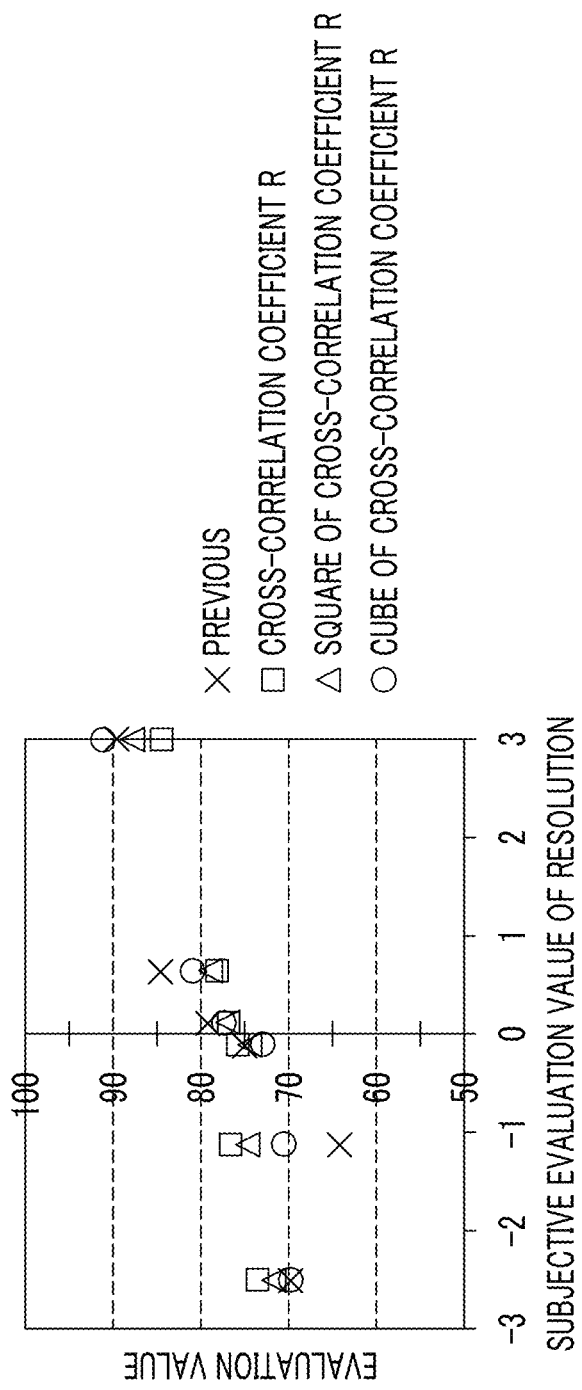
FIG. 10 is a graph in which the graphs of FIGS. 6 to 9 are represented by one graph.

In addition, according to a graph of FIG. 10 in which the graphs of FIGS. 6 to 9 are represented by one graph, it can be understood that the evaluation value calculated using the square of the cross-correlation coefficient R has the smallest variation. In addition, it can be understood that the evaluation value calculated using the cross-correlation coefficient R itself and the evaluation value calculated using the cube of the cross-correlation coefficient R also have a smaller variation than the evaluation value calculated using the previous evaluation method.

Figure 11:
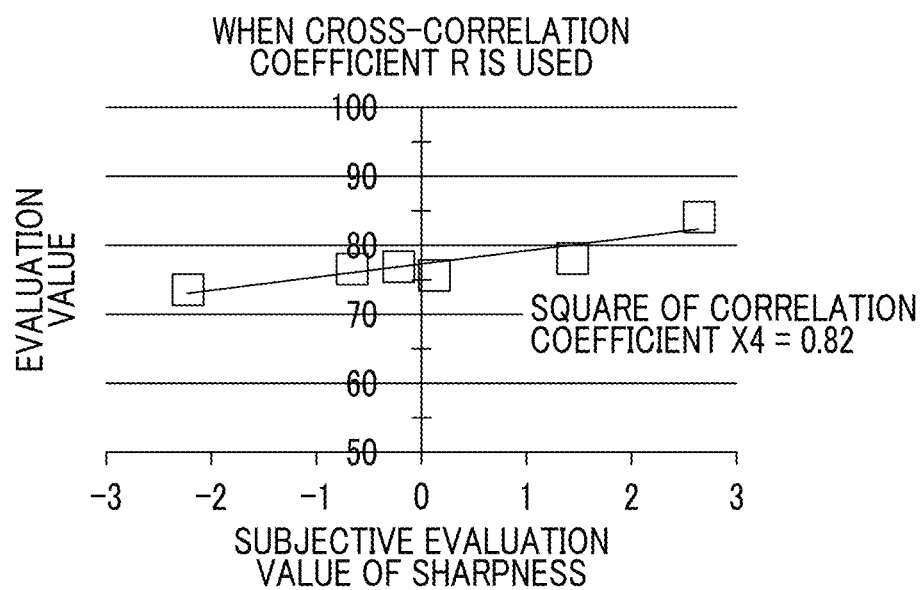
FIG. 11 is a graph illustrating an example of a relationship between the calculation results of the evaluation value and a subjective evaluation value of sharpness when the cross-correlation coefficient R based on the image evaluation device according to the first exemplary embodiment is used.

FIG. 11 shows a graph indicating results in which a relationship between the subjective evaluation value of sharpness as performance regarding the resolution and the evaluation value calculated using the cross-correlation coefficient R is obtained. As shown in FIG. 11, the square of a correlation coefficient X4 between the subjective evaluation value of the resolution and the evaluation value calculated using the cross-correlation coefficient R is 0.82. Meanwhile, the subjective evaluation value of the sharpness is a value obtained by evaluating and digitizing the sharpness based on plural human visual senses, and means that the sharpness increases with an increase in a positive direction.

Here, the subjective evaluation of the sharpness is performed by the following method. First, under a fluorescent light of a D50 standard light source, in a state where a panel and an object to be evaluated are separated 50 cm apart from each other, the lineup of plural objects to be evaluated in order of higher sharpness is performed on the seven panels. The average value of the orders is calculated for each object to be evaluated, and the subjective evaluation value of the sharpness is obtained by converting the calculated average value into a distance scale.

Figure 12:
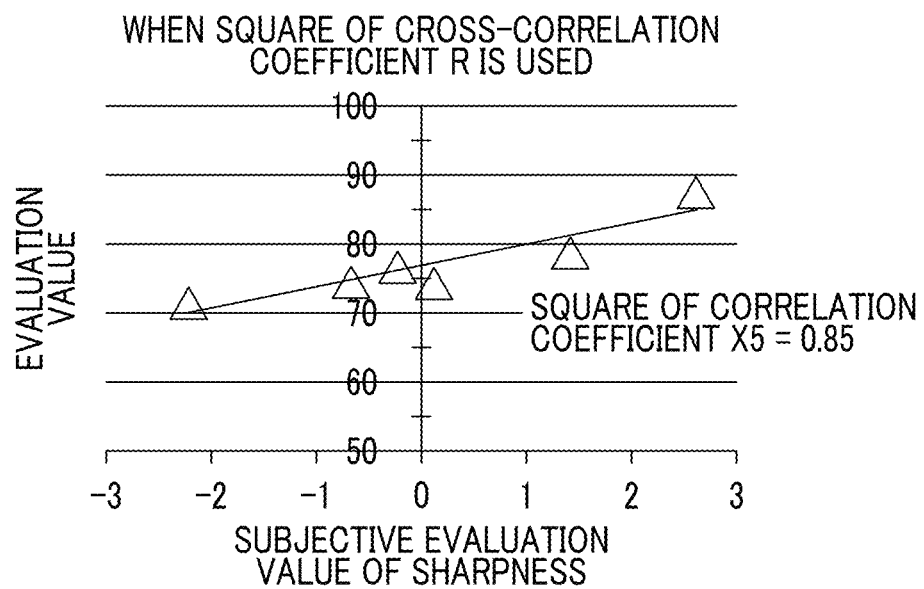
FIG. 12 is a graph illustrating an example of a relationship between the calculation results of the evaluation value and the subjective evaluation value of the sharpness when the square of the cross-correlation coefficient R based on the image evaluation device according to the first exemplary embodiment is used.

In addition, FIG. 12 shows a graph indicating results in which a relationship between the subjective evaluation value of the sharpness and the evaluation value calculated using the square of the cross-correlation coefficient R is obtained. As shown in FIG. 12, the square of a correlation coefficient between the subjective evaluation value of the sharpness and the square of an evaluation value X5 calculated using the square of the cross-correlation coefficient R is 0.85.

Figure 13:
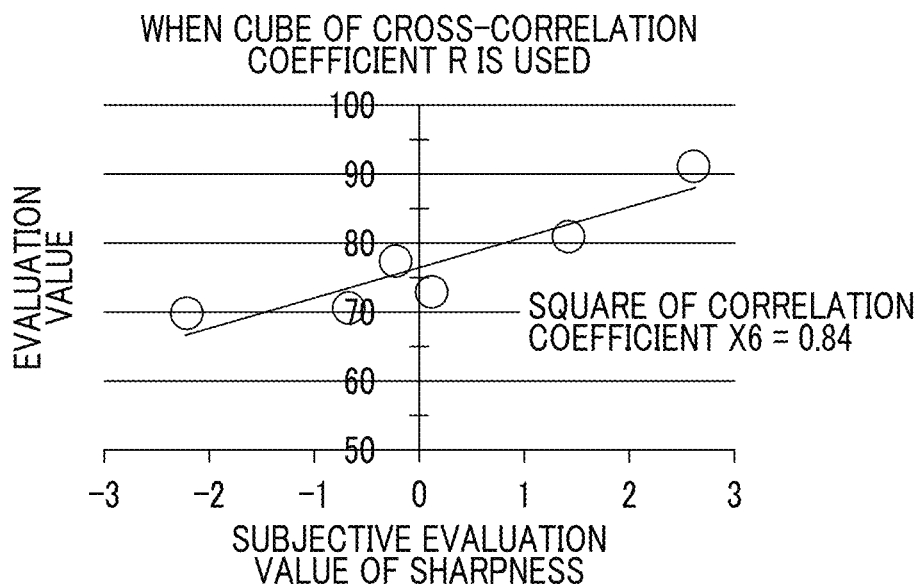
FIG. 13 is a graph illustrating an example of a relationship between the calculation results of the evaluation value and the subjective evaluation value of the sharpness when the cube of the cross-correlation coefficient R based on the image evaluation device according to the first exemplary embodiment is used.

In addition, FIG. 13 shows a graph indicating results in which a relationship between the subjective evaluation value of the sharpness and the evaluation value calculated using the cube of the cross-correlation coefficient R is obtained. As shown in FIG. 13, the square of a correlation coefficient X6 between the subjective evaluation value of the sharpness and the evaluation value calculated using the square of the cross-correlation coefficient R is 0.84.

Figure 14:
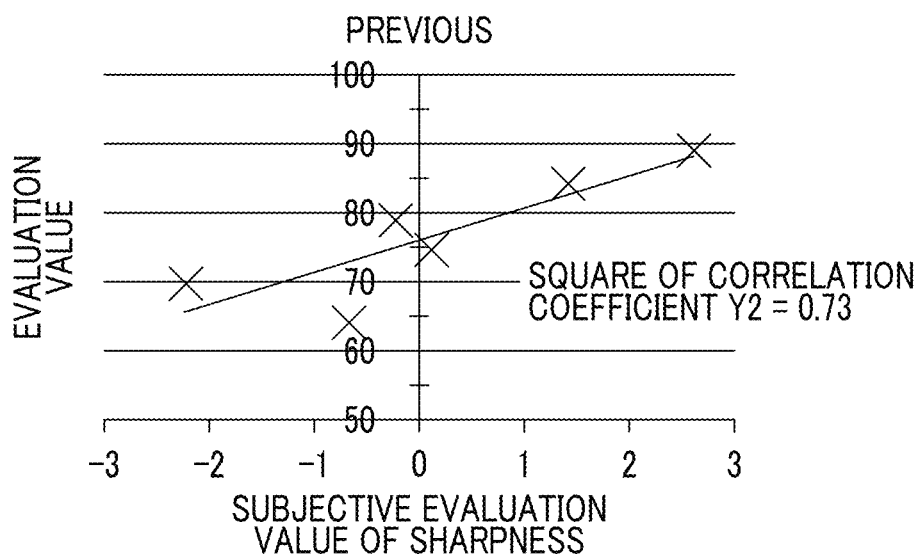
FIG. 14 is a graph illustrating an example of a relationship between the calculation results of the evaluation value and the subjective evaluation value of the sharpness when the previous method based on the image evaluation device according to the first exemplary embodiment is used.

On the other hand, FIG. 14 is a graph indicating results in which a relationship between the subjective evaluation value of the sharpness and the evaluation value calculated using the previous evaluation method is obtained. As shown in FIG. 14, the square of a correlation coefficient Y2 between the subjective evaluation value of the sharpness and the evaluation value calculated using the previous evaluation method is 0.73. Meanwhile, in the previous evaluation method using this graph, L-Score mentioned above is used as the evaluation value.

From FIGS. 11 to 14, it can be understood that the evaluation value calculated using the square of the cross-correlation coefficient R shows the highest correlation with respect to the subjective evaluation value of the resolution. In addition, it can be understood that the evaluation value calculated using the cross-correlation coefficient R itself and the evaluation value calculated using the cube of the cross-correlation coefficient R also show a higher correlation with respect to the subjective evaluation value of the resolution than the evaluation value calculated using the previous evaluation method.

Figure 15:
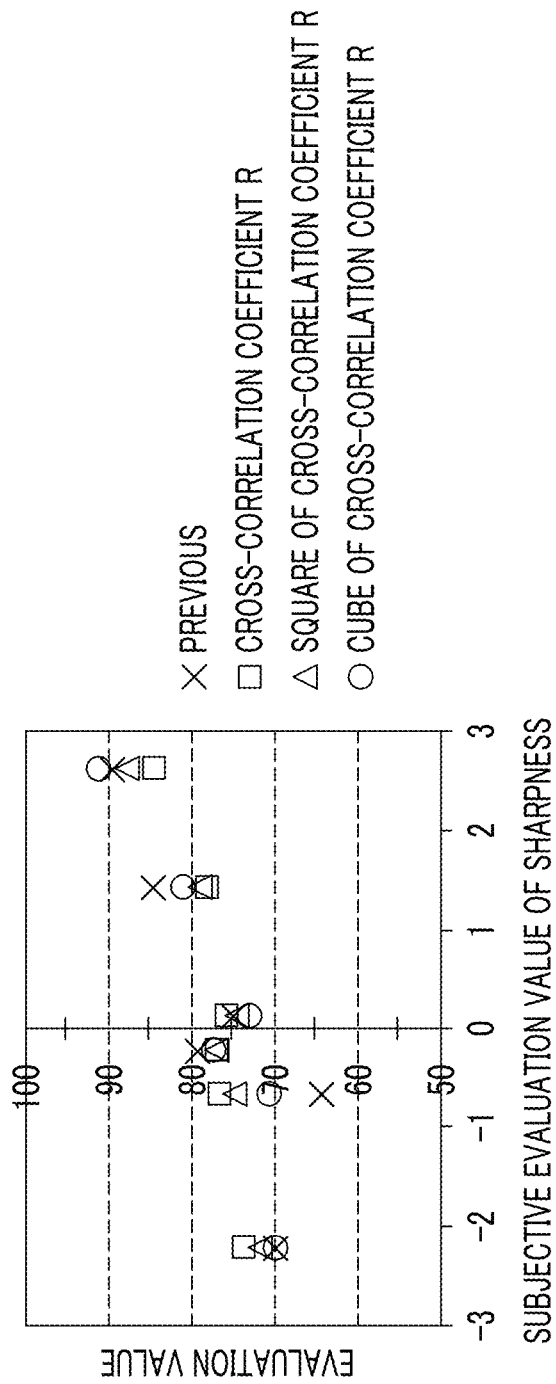
FIG. 15 is a graph in which the graphs of FIGS. 11 to 14 are represented by one graph.

In addition, according to a graph of FIG. 15 in which the graphs of FIGS. 11 to 14 are represented by one graph, it can be understood that the evaluation value calculated using the square of the cross-correlation coefficient R has the smallest variation. In addition, it can be understood that the evaluation value calculated using the cross-correlation coefficient R itself and the evaluation value calculated using the cube of the cross-correlation coefficient R also have a smaller variation than the evaluation value calculated using the previous evaluation method.

Figure 5C:
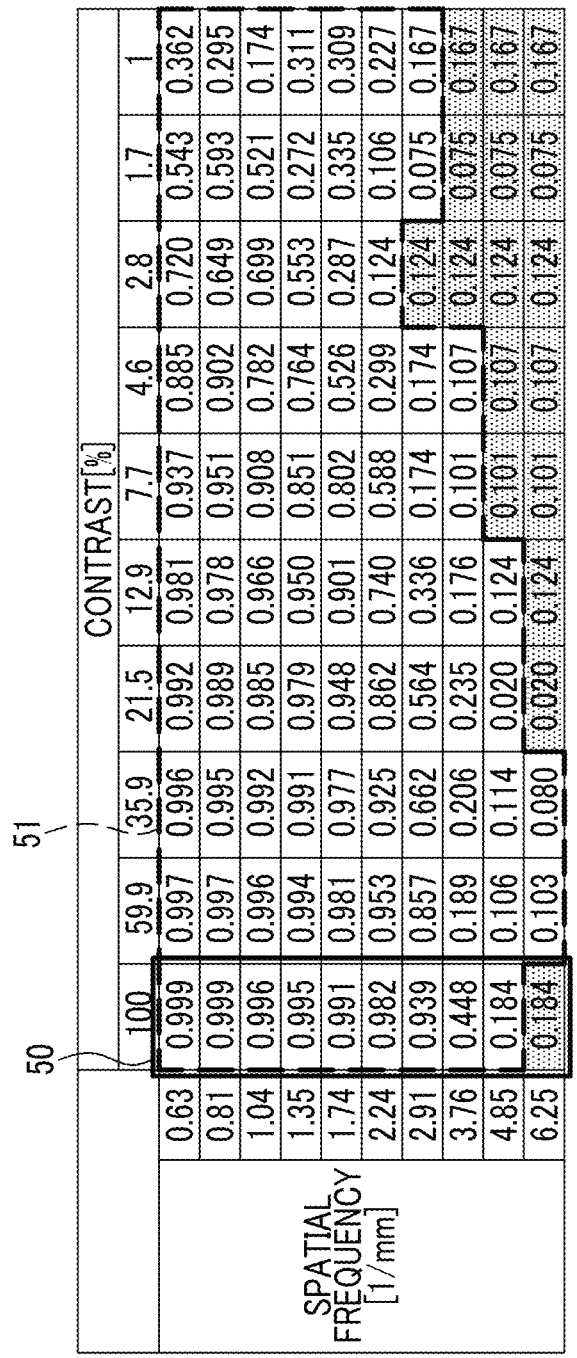
FIG. 5C is a table illustrating another example of a state in which the similarity of the read pattern which is expected to have a spurious resolution generated therein is replaced with a predetermined value in the calculation results of the similarity based on the image evaluation device according to the first exemplary embodiment.

Meanwhile, in the present exemplary embodiment, among similarities of each of the plural read patterns, a description has been given of a case where similarities in a range other than the range 51 in which the similarity gradually becomes smaller as the spatial frequency increases is set as zero (0) which is a predetermined value, but the predetermined value is not limited thereto. For example, as shown in FIG. 5C, a minimum value in a range within the range 51 in which the similarity gradually becomes smaller as the spatial frequency increases may be set as the above predetermined value for each pattern group 50. Alternatively, similarities in a range other than the range 51 in which the similarity gradually becomes smaller as the spatial frequency increases may be replaced with values which gradually become smaller from the above minimum value as the spatial frequency increases.

[Second Exemplary Embodiment]

An image evaluation device according to a second exemplary embodiment is the same as the image evaluation device 10 according to the first exemplary embodiment, and thus the description of each configuration will not be given.

In the above-mentioned first exemplary embodiment, a description has been given of a case where the read pattern in which a spurious resolution is expected to be generated is excluded from the evaluation object based on a change in spatial frequency. On the other hand, in the second exemplary embodiment, a description will be given of a case where the read pattern in which a spurious resolution is expected to be generated is excluded from the evaluation object based on a change in contrast.

A flow of processes when the CPU 14 of the image evaluation device 10 according to the present exemplary embodiment performs image evaluation processing will be described with reference to a flow diagram shown in FIG. 16. Meanwhile, in the present exemplary embodiment, a program of the image evaluation processing is stored in the non-volatile memory 20 in advance, but there is no limitation thereto. For example, the program of the image evaluation processing may be received from an external device through the communication unit 28 and be stored in the non-volatile memory 20. In addition, the program of the image evaluation processing which is recorded on a recording medium such as a CD-ROM is read through the I/O interface 22 by a CD-ROM drive or the like, and thus the image evaluation processing may be executed.

As is the case with the first exemplary embodiment, in order to cause the reader 30 to read the printing medium 40 on which the pattern image is printed by any of the printers A to C, a user disposes the printing medium 40 at the reading position of the reader 30, operates the operating unit 24, and inputs an image reading instruction.

Consequently, in steps S201 to S211, the same processes as those of steps S101 to S111 described above are respectively performed, and the flow transitions to step S213.

In step S213, a pattern group equal in spatial frequency and the square of the cross-correlation coefficient R of the pattern group are extracted from the square of the cross-correlation coefficient R calculated in step S211. For example, as in a pattern group 52 of FIG. 17A, the square of the cross-correlation coefficient R of pattern groups having a spatial frequency of 0.63 [1/mm] and different contrasts is extracted.

In the next step S215, a read pattern having the highest contrast and the square of a cross-correlation coefficient R3 of the read pattern are extracted from the read patterns included in the pattern group extracted in step S213. For example, the square of the cross-correlation coefficient R3 of read patterns having a spatial frequency of 0.63 [1/mm] and a contrast of 100[%] are extracted from the pattern group 52 of FIG. 17A.

In the next step S217, a read pattern having the second lowest contrast next to the read pattern extracted in step S215 and the square of a cross-correlation coefficient R4 of the read pattern are extracted from the read patterns included in the pattern group extracted in step S213. For example, the square of the cross-correlation coefficient R4 of a read pattern having the second highest contrast of 59.9[%] next to 100[%] is extracted from the pattern group 52 of FIG. 17A.

In the next step S219, it is determined whether the square of the cross-correlation coefficient R3 extracted in step S215 is larger than the square of the cross-correlation coefficient R4 extracted in step S217. When the square of the cross-correlation coefficient R3 is not larger than the square of the cross-correlation coefficient R4 (S219, N), a spurious resolution is predicted to be generated, and thus the flow transitions to step S225. On the other hand, when the square of the cross-correlation coefficient R3 is larger than the square of the cross-correlation coefficient R4 (S219, Y), a spurious resolution is predicted not to be generated, and the flow transitions to step S221.

In step S221, the cross-correlation coefficient R4 of the read pattern extracted in step S217 is set as the cross-correlation coefficient R3. In the next step S223, it is determined whether unprocessed read patterns, that is, read patterns which are not extracted in any of steps S215 and S217 are present. When the unprocessed read patterns are present (S223, Y), the flow transitions to step S217. On the other hand, when the unprocessed read patterns are not present (S223, N), the flow transitions to step S227 described later.

Figure 17B:
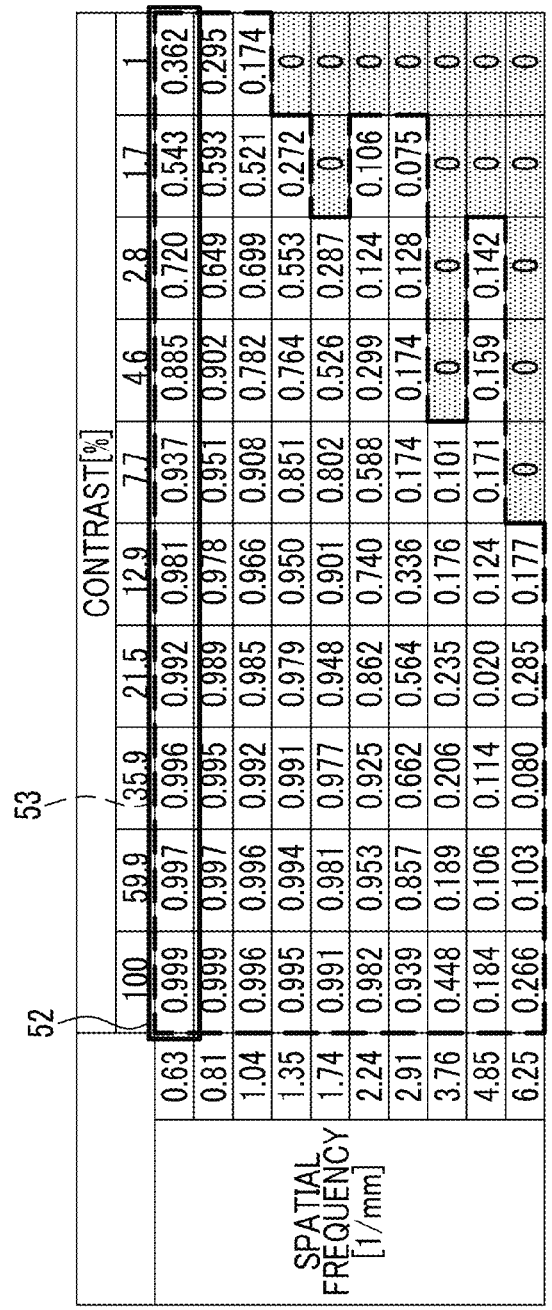
FIG. 17B is a table illustrating an example of a state in which a similarity of a read pattern which is expected to have a spurious resolution generated therein is replaced with a predetermined value, in the table illustrating the calculation results of the similarity based on the image evaluation device according to the second exemplary embodiment.

On the other hand, in step S225, the square of the cross-correlation coefficient R of a read pattern having a contrast equal to or less than the contrast of the read pattern extracted in step S217 is replaced with a predetermined value. In the present exemplary embodiment, the above predetermined value is set as zero (0) which is a minimum value in a range in which the square of the cross-correlation coefficient R is acquired. That is, as shown in FIGS. 17A and 17B, among similarities of each of the plural read patterns, similarities in a range other than a range 53 in which the similarity gradually becomes smaller as the contrast lowers are replaced with zero (0) for each pattern group. This replacement leads to the similarity incorrectly calculated by a spurious resolution being added to the evaluation object, and thus the evaluation results are avoided from deviating from an evaluation based on a human visual sense.

In step S227, it is determined whether unprocessed pattern groups, that is, pattern groups on which the processes of steps S213 to S225 are not performed are present. When the unprocessed pattern groups are present (S227, Y), the flow transitions to step S213. On the other hand, when the unprocessed pattern groups are not present (S227, N), the flow transitions to step S229 described later. For example, pattern groups are extracted in ascending order of spatial frequency from plural pattern groups included in the pattern image in step S213, the processes of steps S215 to S225 are performed on all the pattern groups, and then the flow transitions to step S229.

In step S229, the sum of the square of the cross-correlation coefficients R of the read patterns included in the read image is calculated as an evaluation value. In the next step S231, the display unit 26 is controlled so that the calculated evaluation value is displayed on the display unit 26, and the execution of the program is terminated.

Meanwhile, in the present exemplary embodiment, as is the case with the first exemplary embodiment, the evaluation value is calculated using the square of the cross-correlation coefficient R between the read pattern and the ideal pattern, but there is no limitation thereto. Even when the evaluation value is calculated using the cross-correlation coefficient R or the cube of the cross-correlation coefficient R, the same results as those in the first exemplary embodiment are obtained.

Figure 18B:
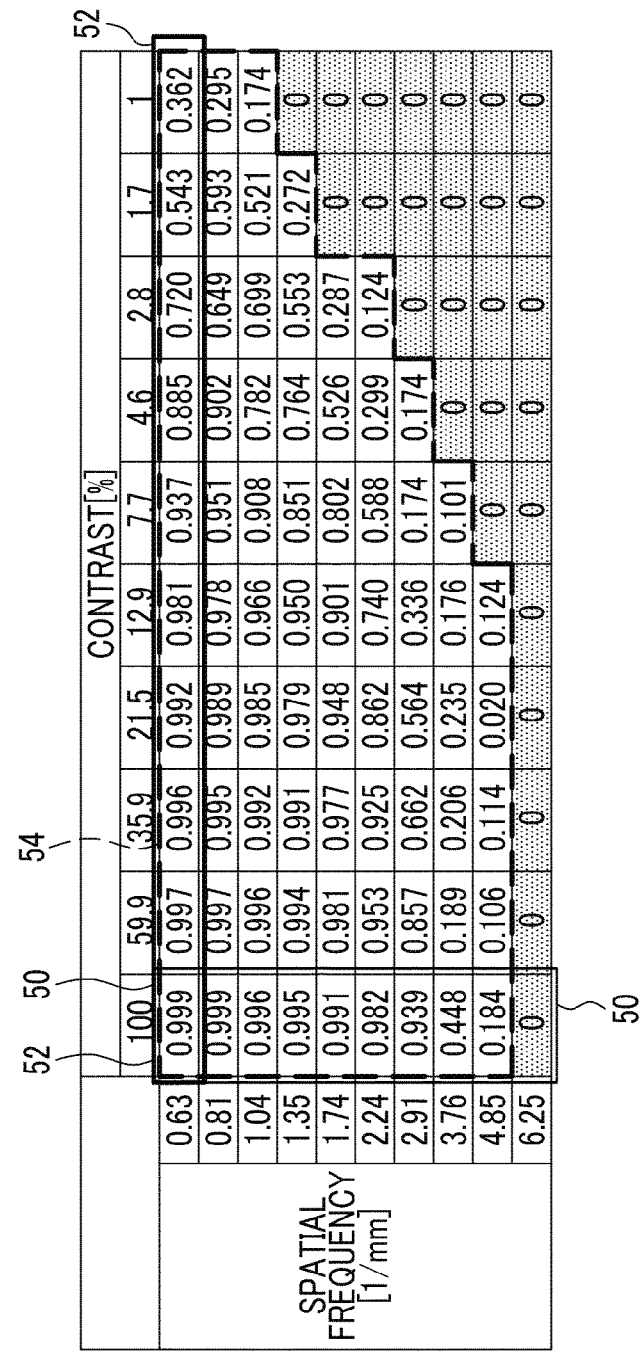
FIG. 18B is a table illustrating an example of a state in which the similarity of the read pattern which is expected to have a spurious resolution generated therein is replaced with a predetermined value, in the table illustrating the calculation results of the similarity based on the image evaluation device according to the second exemplary embodiment.

In addition, the read pattern in which a spurious resolution is expected to be generated is extracted based on a change in spatial frequency in the first exemplary embodiment, and based on a change in contrast in the second exemplary embodiment, but an extraction method is not limited thereto. That is, the read pattern in which a spurious resolution is expected to be generated may be excluded from the evaluation object based on both the spatial frequency and the contrast. In this case, in the flow diagram of FIG. 4, the processes of steps S213 to S227 of FIG. 16 may be performed immediately before step S113, or the processes of steps S213 to S227 of FIG. 16 may be performed immediately after step S127. In addition, in this case, as shown in FIGS. 18A and 18B, similarities in a range other than a range 54 in which the similarity becomes smaller as the spatial frequency increases and the similarity becomes smaller as the contrast lowers are set as zero (0). In this manner, the square of the cross-correlation coefficient R of the read pattern in which a spurious resolution is expected to be generated is set as zero (0), and the read pattern is excluded from the evaluation object.

In addition, in the present exemplary embodiment, a description has been given of a case where, among similarities of each of the plural read patterns, similarities in a range other than the range 53 in which the similarity gradually becomes smaller as the contrast lowers are set as zero (0), but the predetermined value is not limited thereto. For example, a minimum value in a range within the range 53 in which the similarity gradually becomes smaller as the contrast lowers may be set as the above predetermined value for each pattern group 52. Alternatively, similarities in a range other than the range 53 in which the similarity gradually becomes smaller as the contrast lowers may be replaced with values which gradually become smaller from the above minimum value as the contrast lowers.

[Third Exemplary Embodiment]

An image evaluation device according to a third exemplary embodiment is the same as the image evaluation device 10 according to the first exemplary embodiment and the second exemplary embodiment, and thus the description of each configuration will not be given.

In the first exemplary embodiment and the second exemplary embodiment, a description has been given of a case where the read pattern in which a spurious resolution is expected to be generated is excluded from the evaluation object. On the other hand, in the third exemplary embodiment, a description will be given of a case where the ideal pattern and the read pattern having a low correlation are excluded from the evaluation object in accordance with the value of the square of the cross-correlation coefficient R.

A flow of processes when the CPU 14 of the image evaluation device 10 according to the present exemplary embodiment performs image evaluation processing will be described with reference to a flow diagram shown in FIG. 19. Meanwhile, in the present exemplary embodiment, a program of the image evaluation processing is stored in the non-volatile memory 20 in advance, but there is no limitation thereto. For example, the program of the image evaluation processing may be received from an external device through the communication unit 28 and be stored in the non-volatile memory 20. In addition, the program of the image evaluation processing which is recorded on a recording medium such as a CD-ROM is read through the I/O interface 22 by a CD-ROM drive or the like, and thus the image evaluation processing may be executed.

As is the case with the first exemplary embodiment, in order to cause the reader 30 to read the printing medium 40 on which the pattern image is printed by any one of the printers A to C, a user disposes the printing medium 40 at the reading position of the reader 30, operates the operating unit 24, and inputs an image reading instruction.

Consequently, in steps S301 to S311, the same processes as those of steps S101 to S111 described above are respectively performed, and the flow transitions to step S313.

In step S313, the square of the cross-correlation coefficient R of a read pattern in which the square of the cross-correlation coefficient R calculated in step S311 is equal to or less than a predetermined threshold is replaced with a predetermined value. In the present exemplary embodiment, the above predetermined threshold is set as 0.5. In addition, in the present exemplary embodiment, the above predetermined value is set as zero (0) which is a minimum value in a range in which the square of the cross-correlation coefficient R is acquired. That is, as shown in FIGS. 20A and 20B, among similarities of each of plural read patterns, similarities of equal to or greater than 0.5 are replaced with zero (0). This replacement leads to the similarity incorrectly calculated by a spurious resolution being added to the evaluation object, and thus the evaluation results are avoided from deviating from an evaluation based on a human visual sense.

In step S315, the sum of the square of the cross-correlation coefficients R of the read patterns included in the read image is calculated as an evaluation value. In the next step S317, the display unit 26 is controlled so that the calculated evaluation value is displayed on the display unit 26, and the execution of the program is terminated.

Meanwhile, in the present exemplary embodiment, as is the case with the first exemplary embodiment, the evaluation value is calculated using the square of the cross-correlation coefficient R between the read pattern and the ideal pattern, but there is no limitation thereto. Even when the evaluation value is calculated using the cross-correlation coefficient R or the cube of the cross-correlation coefficient R, the same results as those in the first exemplary embodiment are obtained.

In addition, in the first exemplary embodiment to the third exemplary embodiment, the sum of the similarities of the read patterns included in the read image is calculated as an evaluation value, but a value obtained by subtracting the similarity of each read pattern from a maximum value in a range in which the sum of the similarities is acquired may be set as an evaluation value, without being limited thereto. Meanwhile, in the present exemplary embodiment, since the maximum value of the square of the cross-correlation coefficient R indicating the similarity is 1, and the number of read patterns is 100, the maximum value of the sum of the similarities is 100. In addition, a normalized coefficient or the like may be applied to the sum of the similarities so that a certain value is set as a maximum value.

[Fourth Exemplary Embodiment]

An image evaluation device according to a fourth exemplary embodiment is the same as the image evaluation device 10 according to the first exemplary embodiment to the third exemplary embodiment, and thus the description of each configuration will not be given.

In the first exemplary embodiment to the third exemplary embodiment, a description has been given a case where the cross-correlation coefficient R between the read pattern and the ideal pattern is used as the similarity of the read pattern. On the other hand, in the fourth exemplary embodiment, a description will be given of a case where a difference in contrast between the read pattern and the ideal pattern is used as the similarity of the read pattern.

Figure 21:
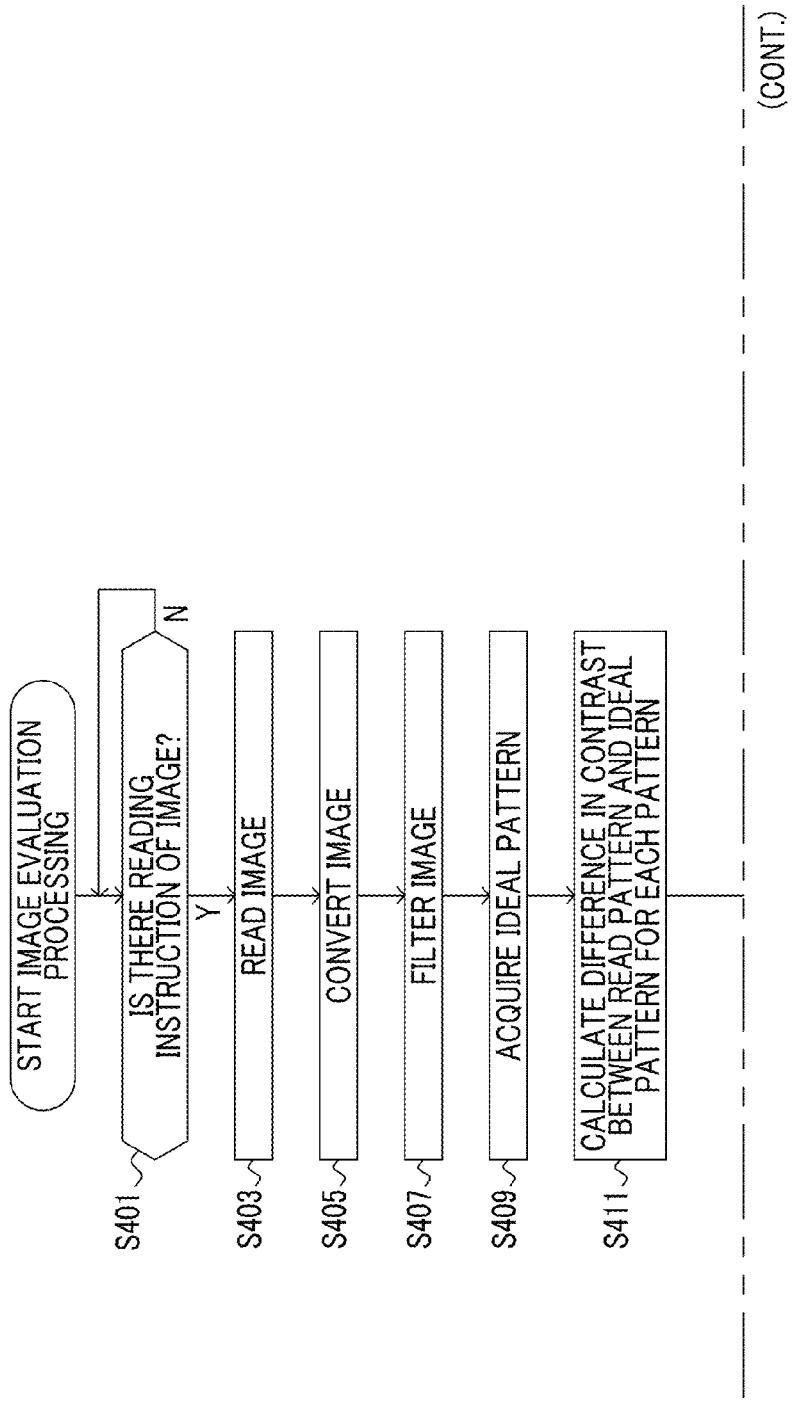
FIG. 21 is a flow diagram illustrating a flow of processes of a program of an image evaluation processing according to a fourth exemplary embodiment.

A flow of processes when the CPU 14 of the image evaluation device 10 according to the present exemplary embodiment performs image evaluation processing will be described with reference to a flow diagram shown in FIG. 21. Meanwhile, in the present exemplary embodiment, a program of the image evaluation processing is stored in the non-volatile memory 20 in advance, but there is no limitation thereto. For example, the program of the image evaluation processing may be received from an external device through the communication unit 28 and be stored in the non-volatile memory 20. In addition, the program of the image evaluation processing which is recorded on a recording medium such as a CD-ROM is read through the I/O interface 22 by a CD-ROM drive or the like, and thus the image evaluation processing may be executed.

As is the case with the first exemplary embodiment, in order to cause the reader 30 to read the printing medium 40 on which the pattern image is printed by any of the printers A to C, a user disposes the printing medium 40 at the reading position of the reader 30, operates the operating unit 24, and inputs an image reading instruction.

Consequently, in steps S401 to S409, the same processes as those of steps S101 to S109 described above are respectively performed, and the flow transitions to step S411.

In step S411, a difference in contrast between the read pattern and the ideal pattern is calculated as the similarity for each read pattern. When the difference in contrast between the read pattern and the ideal pattern is used as the similarity, the read pattern shows a deterioration from the ideal pattern with an increase in the difference. In addition, the read pattern shows that the reproduction of the ideal pattern is satisfactory (similar) with a decrease in the difference.

Here, the read pattern in which a spurious resolution is expected to be generated is excluded from the evaluation object by performing the processes of steps S413 to 427 described later.

In step S413, a pattern group equal in contrast and a difference in contrast between the ideal pattern and the read pattern included in the pattern group are extracted from the difference calculated in step S411.

In the next step S415, a read pattern having the lowest spatial frequency and a difference S1 in contrast between the read pattern and the ideal pattern are extracted from the difference extracted in step S413.

In the next step S417, a read pattern having the second lowest spatial frequency next to the read pattern extracted in step S415 and a difference S2 in contrast between the read pattern and the ideal pattern are extracted from the difference extracted in step S413.

In the next step S419, it is determined whether the difference S2 extracted in step S417 is larger than the difference S1 extracted in step S415. When the difference S2 is not larger than the difference S1 (S419, N), a spurious resolution is predicted to be generated, and thus the flow transitions to step S425. On the other hand, when the difference S2 is larger than the difference S1 (S419, Y), a spurious resolution is predicted not to be generated, and thus the flow transitions to step S421.

In step S421, the difference S2 extracted in step S417 is set as the difference S1. In the next step S423, it is determined whether unprocessed read patterns, that is, read patterns which are not extracted in any of steps S415 and S417 among the read patterns extracted in step S413 are present. When the unprocessed read patterns are present (S423, Y), the flow transitions to step S417. On the other hand, when the unprocessed read patterns are not present (S423, N), the flow transitions to step S427 described later.

On the other hand, in step S425, a difference between read patterns having a spatial frequency equal to or higher than the spatial frequency of the read pattern extracted in step S417 is replaced with a predetermined value. In the present exemplary embodiment, the above predetermined value is set as 100 which is a maximum value of a difference between contrasts, but there is no limitation thereto. For example, a maximum value in a range other than a range in which the similarity gradually becomes larger as the spatial frequency increases may be set as the above predetermined value for each pattern group. Alternatively, similarities in a range other than a range in which the similarity gradually becomes larger as the spatial frequency increases may be replaced with values which gradually become larger from the above maximum value as the spatial frequency increases.

In step S427, it is determined whether unprocessed pattern groups, that is, pattern groups on which the processes of steps S413 to S425 are not performed are present. When the unprocessed pattern groups are present (S427, Y), the flow transitions to step S413. On the other hand, when the unprocessed pattern groups are not present (S427, N), the flow transitions to step S429 described later. For example, pattern groups are extracted in descending order of contrast from plural pattern groups equal in contrast in step S413, the processes of steps S415 to S425 are performed on all the pattern groups, and then the flow transitions to step S429.

In step S429, the sum of differences between the read patterns included in the read image is calculated as an evaluation value. In the next step S431, the display unit 26 is controlled so that the calculated evaluation value is displayed on the display unit 26, and the execution of the program is terminated.

Meanwhile, in the first exemplary embodiment to the fourth exemplary embodiment, a description has been given of a case where the reader 30 is connected to the image evaluation device 10, and the image evaluation device 10 acquires the read image from the reader 30, but there is no limitation thereto. For example, the image evaluation device 10 may be configured to receive image information indicating the read image through the communication unit 28. In this case, a process of receiving the image information may be performed instead of performing each of the processes of steps S101 and S103 of FIG. 4, steps S201 to S203 of FIG. 16, steps S301 to S303 of FIG. 19, and steps S401 to S403 of FIG. 21.

In addition, in the first exemplary embodiment to the fourth exemplary embodiment, a description has been given of a case where patterns in which plural concentric circles having different radii are drawn are used as plural patterns included in the pattern image, but the plural patterns are not limited thereto. For example, the plural patterns included in the pattern image may be patterns in which plural parallel straight lines or curved lines are drawn.

In addition, in the first exemplary embodiment to the fourth exemplary embodiment, a description has been given of a case where performance regarding the resolutions of the printers 10A to 10C is evaluated using image information of RGB which is output from the reader 30 configured to include a color scanner, but there is no limitation thereto. For example, the evaluation may be performed using black and white image information which is output from the reader, using a reader configured to include a monochrome scanner. In this case, the process of step S105 may be omitted.

In addition, in the first exemplary embodiment to the fourth exemplary embodiment, a description has been given of a case where performance regarding the resolutions of the printers 10A to 10C is evaluated using a black and white pattern image, but the evaluation may be performed using image information of a color, without being limited thereto.

In addition, in the first exemplary embodiment to the fourth exemplary embodiment, a description has been given of a case where performance regarding the resolution of the printer is evaluated, but there is no limitation thereto. For example, regarding an image pickup device, the resolution of an image (image pickup device) may be evaluated by capturing an image of an ideal pattern displayed on a medium such as a screen, and comparing patterns included in the captured image with a corresponding ideal pattern.

In addition, noise is generated in a specific read pattern when the pattern image is read by the reader 30, and thus there may be a case in which the similarity of the read pattern is greatly different from the similarity of a surrounding read pattern. Therefore, a read pattern in which a difference in similarity between adjacent read patterns is equal to or greater than a threshold is set as a read pattern in which noise is generated, and thus may be excluded from the evaluation object.

In addition, a method of specifying a read pattern having the possibility of the spurious resolution of the third exemplary embodiment being generated may be applied to the fourth exemplary embodiment. That is, the read pattern having the difference equal to or greater than a predetermined threshold may be specified to be a read pattern having the possibility of a spurious resolution being generated, and a difference between the read patterns may be replaced with the above predetermined value.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image evaluation device comprising:
   at least one processor configured to execute:
      an acquisition unit that acquires an image including a plurality of patterns having different spatial frequencies and contrasts; and
      an output unit that compares each of a plurality of patterns included in the image acquired by the acquisition unit with each of a plurality of ideal patterns corresponding to the plurality of patterns, calculates similarities therebetween, and outputs an evaluation value for evaluating performance regarding a resolution of the image based on a sum of the calculated similarities of the plurality of patterns,
   wherein the image is an image in which the plurality of patterns are disposed so that the spatial frequencies of the plurality of ideal patterns to which each of the plurality of patterns corresponds gradually increase in a first predetermined direction, and that the contrasts of the plurality of ideal patterns to which each of the plurality of patterns corresponds gradually lower in a second direction intersecting the first predetermined direction,
   wherein the output unit calculates the evaluation value based on the similarities within a range in which, among the similarities of each of the plurality of patterns, the similarities gradually become smaller as the spatial frequencies gradually increase in the first predetermined direction, and
   wherein the output unit calculates the evaluation value by replacing the similarities outside a range in which the similarities gradually become smaller, among the similarities of each of the plurality of patterns, with zero or a minimum value within a range in which the similarities gradually become smaller.

2. The image evaluation device according to claim 1, wherein the similarity is any one of a first power to a cube of a cross-correlation coefficient between the pattern and the ideal pattern.

3. The image evaluation device according to claim 2, wherein the similarity is the square of the cross-correlation coefficient between the pattern and the ideal pattern.

4. The image evaluation device according to claim 1, wherein the image is an image in which the plurality of patterns are disposed so that the spatial frequencies of the plurality of ideal patterns to which each of the plurality of patterns corresponds gradually increase in a first predetermined direction, and that the contrasts of the plurality of ideal patterns to which each of the plurality of patterns corresponds gradually lower in a second direction intersecting the first predetermined direction, and
   the output unit calculates the evaluation value based on the similarities within a range in which, the similarities of each of the plurality of patterns, the similarities gradually become smaller as the contrasts gradually lower in the second direction.

5. The image evaluation device according to claim 2, wherein the image is an image in which the plurality of patterns are disposed so that the spatial frequencies of the plurality of ideal patterns to which each of the plurality of patterns corresponds gradually increase in a first predetermined direction, and that the contrasts of the plurality of ideal patterns to which each of the plurality of patterns corresponds gradually lower in a second direction intersecting the first predetermined direction, and the output unit calculates the evaluation value based on the similarities within a range in which, the similarities of each of the plurality of patterns, the similarities gradually become smaller as the contrasts gradually lower in the second direction.

6. The image evaluation device according to claim 3, wherein the image is an image in which the plurality of patterns are disposed so that the spatial frequencies of the plurality of ideal patterns to which each of the plurality of patterns corresponds gradually increase in a first predetermined direction, and that the contrasts of the plurality of ideal patterns to which each of the plurality of patterns corresponds gradually lower in a second direction intersecting the first predetermined direction, and the output unit calculates the evaluation value based on the similarities within a range in which, the similarities of each of the plurality of patterns, the similarities gradually become smaller as the contrasts gradually lower in the second direction.

7. The image evaluation device according to claim 1, wherein the output unit calculates the evaluation value based on the similarities in which a range of predetermined values, among the similarities of each of the plurality of patterns.

8. The image evaluation device according to claim 1, wherein each of the plurality of patterns is configured such that a plurality of circles of a first color having different radii and a plurality of circles of a second color having different radii are alternately drawn as concentric circles.

9. An image evaluation system comprising:

the image evaluation device according to claim 1, wherein the at least one processor is further configured to execute a reading unit that reads an image including a plurality of patterns having different spatial frequencies and contrasts from a printing medium on which the image is printed by a printer.

10. A non-transitory computer readable medium storing instructions causing a computer to execute a process, the process comprising:

acquiring, by an acquisition unit, an image including a plurality of patterns having different spatial frequencies and contrasts; and comparing each of a plurality of patterns included in the image acquired by the acquisition unit with each of a plurality of ideal patterns corresponding to the plurality of patterns, calculating similarities therebetween, and outputting, by an output unit, an evaluation value for evaluating performance regarding a resolution of the image based on a sum of the calculated similarities of the plurality of patterns, wherein the image is an image in which the plurality of patterns are disposed so that the spatial frequencies of the plurality of ideal patterns to which each of the plurality of patterns corresponds gradually increase in a first predetermined direction, and that the contrasts of the plurality of ideal patterns to which each of the plurality of patterns corresponds gradually lower in a second direction intersecting the first predetermined direction, wherein the process further comprises:

calculating, by the output unit, the evaluation value based on the similarities within a range in which, among the similarities of each of the plurality of patterns, the similarities gradually become smaller as the spatial frequencies gradually increase in the first predetermined direction, and calculating, by the output unit, the evaluation value by replacing the similarities outside a range in which the similarities gradually become smaller, among the similarities of each of the plurality of patterns, with zero or a minimum value within a range in which the similarities gradually become smaller.

\* \* \* \* \*